US011474664B2

(12) United States Patent
Zhu et al.

(10) Patent No.: US 11,474,664 B2
(45) Date of Patent: Oct. 18, 2022

(54) APPLICATION ICON MOVING METHOD AND ELECTRONIC DEVICE

(71) Applicant: Huawei Technologies Co., Ltd., Shenzhen (CN)

(72) Inventors: Jinpeng Zhu, Shenzhen (CN); Zongfang Lin, Santa Clara, CA (US); Wenjie Ren, Beijing (CN); Junmin Zhao, Shenzhen (CN)

(73) Assignee: HUAWEI TECHNOLOGIES CO., LTD., Shenhen (CN)

( * ) Notice: Subject to any disclaimer, the term of this patent is extended or adjusted under 35 U.S.C. 154(b) by 0 days.

(21) Appl. No.: 17/432,801

(22) PCT Filed: Feb. 20, 2020

(86) PCT No.: PCT/CN2020/075970
§ 371 (c)(1),
(2) Date: Aug. 20, 2021

(87) PCT Pub. No.: WO2020/173370
PCT Pub. Date: Sep. 3, 2020

(65) Prior Publication Data
US 2022/0197482 A1   Jun. 23, 2022

(30) Foreign Application Priority Data
Feb. 26, 2019  (CN) .......................... 201910144695.3

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01); *G06F 8/61* (2013.01); *G06F 9/451* (2018.02)

(58) Field of Classification Search
None
See application file for complete search history.

(56) References Cited

U.S. PATENT DOCUMENTS

2010/0122194 A1    5/2010  Rogers
2010/0295789 A1   11/2010  Shin et al.
(Continued)

FOREIGN PATENT DOCUMENTS

CN    102439558 A    5/2012
CN    102446059 A    5/2012
(Continued)

OTHER PUBLICATIONS

Qi Bin, "It's time to learn about android7: shortcuts," Oct. 21, 2016, CSDN, https://blog.csdn.net/qibin0506/article/details/52878690, 21 pages.

*Primary Examiner* — Ryan Barrett
(74) *Attorney, Agent, or Firm* — Conley Rose, P.C.

(57) ABSTRACT

An application icon moving method and an electronic device, where after a first application is installed in the electronic device, the electronic device displays an interface including an icon of the first application, when receiving a second operation from a user on the icon of the first application, the electronic device displays a management menu around the icon of the first application, where the management menu includes one or more of an identifier of a sub-screen of a home screen of the electronic device or an identifier of a folder included in a sub-screen. The electronic device receives a third operation from the user on a first identifier included in the management menu, and move, in response to the third operation, the icon of the first application to a sub-screen or a folder corresponding to the first identifier.

20 Claims, 30 Drawing Sheets

(51) Int. Cl.
*G06F 9/451* (2018.01)
*G06F 8/61* (2018.01)
*G06F 3/0488* (2022.01)

(56) References Cited

U.S. PATENT DOCUMENTS

| | | | |
|---|---|---|---|
| 2012/0084692 A1 | 4/2012 | Bae | |
| 2012/0278722 A1* | 11/2012 | Raleigh | H04W 4/26 |
| | | | 715/735 |
| 2015/0169183 A1 | 6/2015 | Son et al. | |
| 2016/0099981 A1 | 4/2016 | Lou | |
| 2016/0378462 A1* | 12/2016 | Hu | H04L 67/10 |
| | | | 717/173 |
| 2017/0068406 A1* | 3/2017 | Mark | G06F 3/04883 |
| 2018/0348967 A1* | 12/2018 | Kondrk | G06Q 30/0641 |
| 2019/0138186 A1* | 5/2019 | Rolih | H04L 67/55 |
| 2020/0110529 A1* | 4/2020 | Gao | G06F 3/0486 |
| 2020/0371648 A1* | 11/2020 | Huang | G06F 3/0483 |

FOREIGN PATENT DOCUMENTS

| | | |
|---|---|---|
| CN | 102830911 B | 2/2015 |
| CN | 104391724 A | 3/2015 |
| CN | 106648328 A | 5/2017 |
| CN | 106843929 A | 6/2017 |
| CN | 107562321 A | 1/2018 |
| CN | 107977129 A | 5/2018 |
| CN | 108710456 A | 10/2018 |
| CN | 109189286 A | 1/2019 |
| CN | 110032307 A | 7/2019 |
| EP | 2960783 A1 | 12/2015 |
| KR | 20160017535 A | 2/2016 |

\* cited by examiner

Installation of YouTube is completed

TO

APPLICATION ICON MOVING METHOD AND ELECTRONIC DEVICE

This application claims priority to Chinese Patent Application No. 201910144695.3, filed with the China National Intellectual Property Administration on Feb. 26, 2019 and entitled "APPLICATION ICON MOVING METHOD AND ELECTRONIC DEVICE", which is incorporated herein by reference in its entirety.

TECHNICAL FIELD

This application relates to the field of electronic devices, and in particular, to an application icon moving method and an electronic device.

BACKGROUND

Nowadays, electronic devices such as mobile phones have become indispensable communications tools in people's daily life and work. An application (application, APP, hereinafter referred to as an application) is installed on the mobile phone, to improve functions of the mobile phone, and provide richer use experience for a user. For the application installed on the mobile phone, an icon of the application may be displayed on a home screen (which may also be referred to as a desktop) of the mobile phone. The home screen of the mobile phone may include one or more sub-screens, and the user may switch to display different sub-screens by performing a left/right sliding operation.

In the conventional technology, when the user newly installs an application on the mobile phone, the mobile phone usually displays an icon of the application at a vacant position on a last sub-screen of the home screen. If the user wants to move the icon of the application to another sub-screen, the user needs to first perform a series of operations to enable the mobile phone to display the last sub-screen of the home screen, then touch and hold the icon of the application, and finally drag the icon to the another sub-screen, to move the icon. There is the following problem: Operations of moving the icon of the newly installed application are complex, and human-computer interaction performance is relatively poor.

SUMMARY

Embodiments of this application provide an application icon moving method and an electronic device, to resolve complex operations of moving an icon of a newly installed application and relatively poor human-computer interaction performance.

To achieve the foregoing objective, the following technical solutions are used in the embodiments of this application.

According to a first aspect, an embodiment of this application provides an application icon moving method, where the method may be applied to an electronic device, and the method may include: displaying, by the electronic device, a first interface including a first button, for example, the first installation may be an "Install" button used to trigger installation of a first application on the electronic device; receiving, by the electronic device, a first operation performed by the user on the first button; in response to the first operation, installing, by the electronic device, the first application on the electronic device; after the installation of the first application is completed, displaying, by the electronic device, a second interface including an icon of the first application; receiving, by the electronic device, a second operation performed by the user on the icon of the first application in the second interface; in response to the second operation, displaying, by the electronic device, a management menu, where the management menu is displayed around the icon of the first application, and the management menu includes one or more of the following identifiers: an identifier of a sub-screen of a home screen of the electronic device, or an identifier of a folder included in a sub-screen; receiving, by the electronic device, a third operation performed by the user on a first identifier included in the management menu; and in response to the third operation, moving, by the electronic device, the icon of the first application to a sub-screen or a folder corresponding to the first identifier.

According to the foregoing technical solution, when the user wants to move the icon of the first application, the user may perform a corresponding operation on the icon of the first application. In response to the operation, the mobile phone may display the management menu including the identifier of the sub-screen and/or the identifier of the folder included in the sub-screen. The management menu can provide a user with a quick path to a target position (the sub-screen or the folder included in the sub-screen) that the user wants to move to. The user may conveniently and quickly move the icon of the newly installed first application to the target position by using the quick path. This improves human-computer interaction performance. In addition, after the installation of the first application is completed, the user can be assisted to find the icon of the first application more conveniently and quickly. This further improves the human-computer interaction performance and therefore improves user experience.

In a possible implementation, the displaying, by the electronic device, a second interface after the installation of the first application is completed, where the second interface includes an icon of the first application may specifically include: after the installation of the first application is completed, displaying, by the electronic device, the icon of the first application in the second interface in a floating manner, where the second interface is the first interface, or an interface to which the first interface is jumped in response to a user operation. After the installation of the application is completed, the second interface is displayed, and the icon of the newly installed application is displayed in the second interface in the floating manner, so that the user can find the icon of the newly installed application more quickly, and a process in which the user searches for the icon of the newly installed application is omitted.

In another possible implementation, the displaying, by the electronic device, a second interface after the installation of the first application is completed, where the second interface includes an icon of the first application may specifically include: after the installation of the first application is completed, automatically displaying, by the electronic device, a sub-screen of the home screen of the electronic device, where the sub-screen includes the icon of the first application. After the installation of the application is completed, the electronic device automatically displays the sub-screen including the icon of the application, so that the user can find the icon of the newly installed application more quickly, and a process in which the user searches for the icon of the newly installed application is omitted.

In another possible implementation, the displaying, by the electronic device, a second interface after the installation of the first application is completed, where the second interface includes an icon of the first application may specifically include: after the installation of the first application is completed, displaying, by the electronic device, prompt information, where the prompt information is used to prompt the user that the installation of the first application is completed; receiving, by the electronic device, a fourth operation performed by the user on the prompt information; and in response to the fourth operation, displaying, by the electronic device, a sub-screen of the home screen of the electronic device, where the sub-screen includes the icon of the first application. After the installation of the application is completed, the electronic device may first display the prompt information to prompt the user that the installation of the application is completed, and after receiving the fourth operation of the user, display the sub-screen including the icon of the application. In this way, an operation currently performed by the user may not be interrupted, and the user may further be assisted in more quickly finding the icon of the newly installed application, so that a process in which the user searches for the icon of the newly installed application is omitted.

In another possible implementation, when the management menu includes the identifier of the sub-screen of the home screen of the electronic device, and the first identifier is the identifier of the sub-screen, the moving, by the electronic device, the icon of the first application to a sub-screen or a folder corresponding to the first identifier in response to the third operation may specifically include: in response to the third operation, displaying, by the electronic device, an identifier of a folder included in the sub-screen corresponding to the first identifier; receiving, by the electronic device, a fifth operation performed by the user on the identifier of the folder included in the sub-screen corresponding to the first identifier; and in response to the fifth operation, moving, by the electronic device, the icon of the first application to the folder included in the sub-screen corresponding to the first identifier.

In another possible implementation, the identifiers in the management menu are displayed around the icon of the first application in a predefined order, and the predefined order includes: an order of sub-screens on the home screen, and/or an order of first displaying the identifier of the sub-screen and then displaying the identifier of the folder; the identifiers in the management menu are displayed around the icon of the first application in an order of last use time points of the sub-screens or folders; the identifiers in the management menu are displayed around the icon of the first application in descending order of frequencies at which icons of applications are moved to the sub-screens or the folders; and/or the identifiers in the management menu are displayed around the icon of the first application based on a type of the first application, and an identifier of a sub-screen or a folder that includes an application having the same type as the first application is first displayed. In this way, the display order of the identifiers included in the management menu is determined based on the last use time of the user, the type of the first application, or the migration habit of the user, so that the use habit of the user can be better matched, and user experience is improved.

In another possible implementation, the identifier of the sub-screen may be an icon, a thumbnail, or a name. The identifier of the folder may be a folder icon or a folder name.

According to a second aspect, an embodiment of this application provides an electronic device. The electronic device includes one or more processors, a memory, and a touchscreen, where the touchscreen is configured to: receive an operation of a user, and display content according to an indication of the one or more processors; the memory is configured to store one or more programs; and the one or more processors are configured to run the one or more programs to implement the following actions: indicating the touchscreen to display a first interface, where the first interface includes a first button; receiving, by the touchscreen, a first operation performed by the user on the first button; in response to the first operation, installing a first application on the electronic device; after the installation of the first application is completed, indicating the touchscreen to display a second interface, where the second interface includes an icon of the first application; receiving, by the touchscreen, a second operation performed by the user on the icon of the first application; in response to the second operation, indicating the touchscreen to display a management menu, where the management menu is displayed around the icon of the first application, and the management menu includes one or more of the following identifiers: an identifier of a sub-screen of a home screen of the electronic device, or an identifier of a folder included in a sub-screen; receiving, by the touchscreen, a third operation performed by the user on a first identifier included in the management menu; and in response to the third operation, moving the icon of the first application to a sub-screen or a folder corresponding to the first identifier.

In a possible implementation, the indicating the touchscreen to display a second interface after the installation of the first application is completed, where the second interface includes an icon of the first application may specifically include: after the installation of the first application is completed, indicating the touchscreen to display the icon of the first application in the second interface in a floating manner, where the second interface is the first interface, or an interface to which the first interface is jumped in response to a user operation.

In another possible implementation, the indicating the touchscreen to display a second interface after the installation of the first application is completed, where the second interface includes an icon of the first application includes: after the installation of the first application is completed, indicating the touchscreen to automatically display a sub-screen of the home screen of the electronic device, where the sub-screen includes the icon of the first application.

In another possible implementation, the indicating the touchscreen to display a second interface after the installation of the first application is completed, where the second interface includes an icon of the first application may specifically include: after the installation of the first application is completed, indicating the touchscreen to display prompt information, where the prompt information is used to prompt the user that the installation of the first application is completed; receiving, by the touchscreen, a fourth operation performed by the user on the prompt information; and in response to the fourth operation, indicating the touchscreen to display a sub-screen of the home screen of the electronic device, where the sub-screen includes the icon of the first application.

In another possible implementation, when the management menu includes the identifier of the sub-screen of the home screen of the electronic device, and the first identifier is the identifier of the sub-screen, the moving the icon of the first application to a sub-screen or a folder corresponding to the first identifier in response to the third operation may specifically include: in response to the third operation, indicating the touchscreen to display an identifier of a folder included in the sub-screen corresponding to the first identifier; receiving, by the touchscreen, a fifth operation performed by the user on the identifier of the folder included in the sub-screen corresponding to the first identifier; and in response to the fifth operation, moving the icon of the first application to the folder included in the sub-screen corresponding to the first identifier.

In another possible implementation, the identifiers in the management menu are displayed around the icon of the first application in a predefined order, and the predefined order includes: an order of sub-screens on the home screen, and/or an order of first displaying the identifier of the sub-screen and then displaying the identifier of the folder; the identifiers in the management menu are displayed around the icon of the first application in an order of last use time points of the sub-screens or folders; the identifiers in the management menu are displayed around the icon of the first application in descending order of frequencies at which icons of applications are moved to the sub-screens or the folders; and/or the identifiers in the management menu are displayed around the icon of the first application based on a type of the first application, and an identifier of a sub-screen or a folder that includes an application having the same type as the first application is first displayed.

In another possible implementation, the identifier of the sub-screen is an icon, a thumbnail, or a name. The identifier of the folder is a folder icon or a folder name.

According to a third aspect, an embodiment of this application provides a computer storage medium. The computer storage medium includes computer instructions, and when the computer instructions are run on an electronic device, the electronic device is enabled to perform the application icon moving method according to any one of the first aspect or the possible implementations of the first aspect.

According to a fourth aspect, an embodiment of this application provides a computer program product. When the computer program product runs on a computer, the computer is enabled to perform the application icon moving method according to any one of the first aspect or the possible implementations of the first aspect.

According to a fifth aspect, an embodiment of this application provides an apparatus. The apparatus has a function of implementing behavior of the electronic device in the method in the first aspect. The function may be implemented by hardware, or may be implemented by hardware executing corresponding software. The hardware or software includes one or more modules corresponding to the foregoing function, for example, a display unit or module, an input unit or module, an installation unit or module, and a moving unit or module.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

An embodiment of this application provides an application icon moving method, and the method may be applied to an electronic device 100. An application is installed on the electronic device 100, to provide richer use experience for a user.

In this embodiment, one or more applications may be installed on the electronic device 100, and icons of these applications are displayed on a home screen (home screen) of the electronic device 100. The application in this embodiment of this application may be an embedded application (that is, a system application of the electronic device 100), or may be a downloadable application. The embedded application is an application provided as a part implemented by the electronic device 100. The downloadable application is an application that can provide an internet protocol multimedia subsystem (internet protocol multimedia subsystem, IMS) connection of the application. The downloadable application may be an application installed on the electronic device 100 in advance, or may be a third-party application downloaded by the user and installed on the electronic device 100.

The home screen of the electronic device 100 may also be referred to as a desktop. The home screen may include one or more sub-screens (sub-screen), and the one or more sub-screens may be configured to display a control (control element). The user can flick left or right to switch between different sub-screens. The control is a graphical user interface (graphical user interface, GUI) element. The control is a software component included in an application, and controls all data processed by the application and an interaction operation related to the data. The user may interact with the control by performing a direct operation (direct manipulation), to read or edit related information of the application. Usually, the control may include a visible interface element such as an icon (for example, an application icon or a folder icon on the electronic device 100), a button, a menu, a tab, a text box, a dialog box, a status bar, a navigation bar, or a widget.

Figure 1A:
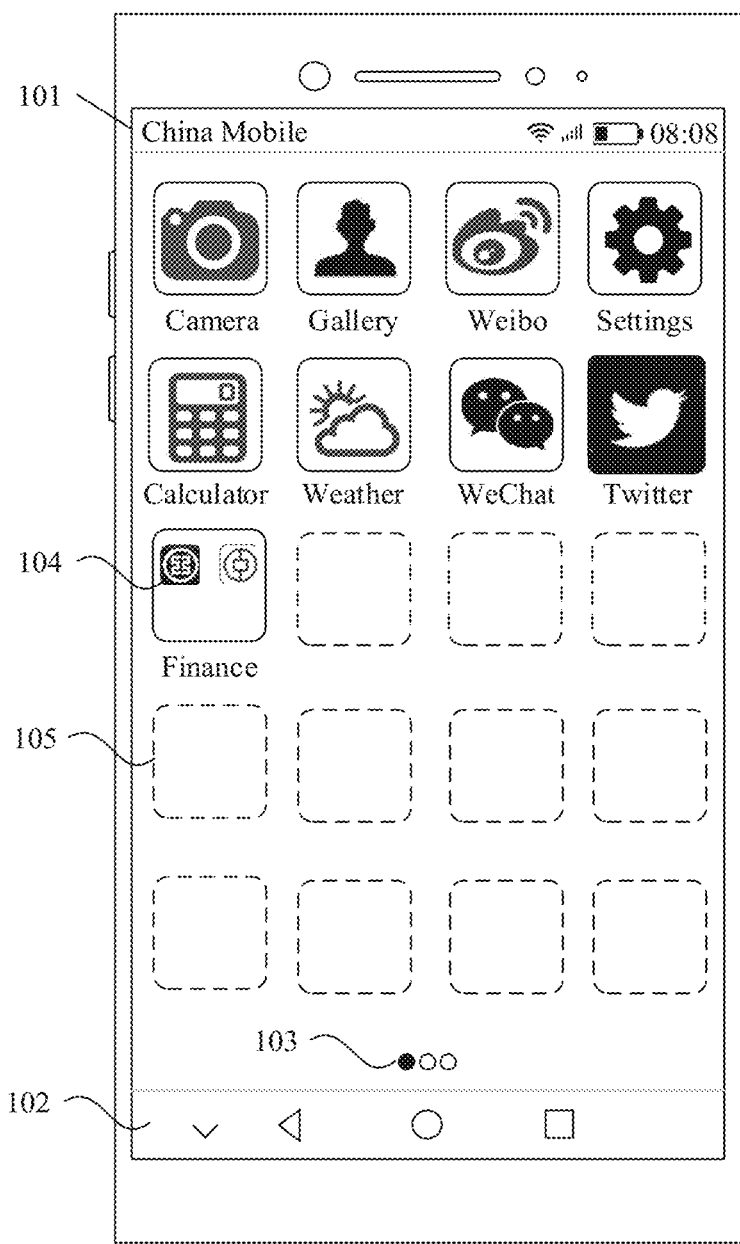
FIG. 1(a), FIG. 1(b), and FIG. 1(c) are schematic diagrams of some interfaces displayed on an electronic device according to an embodiment of this application.
Figure 1B:
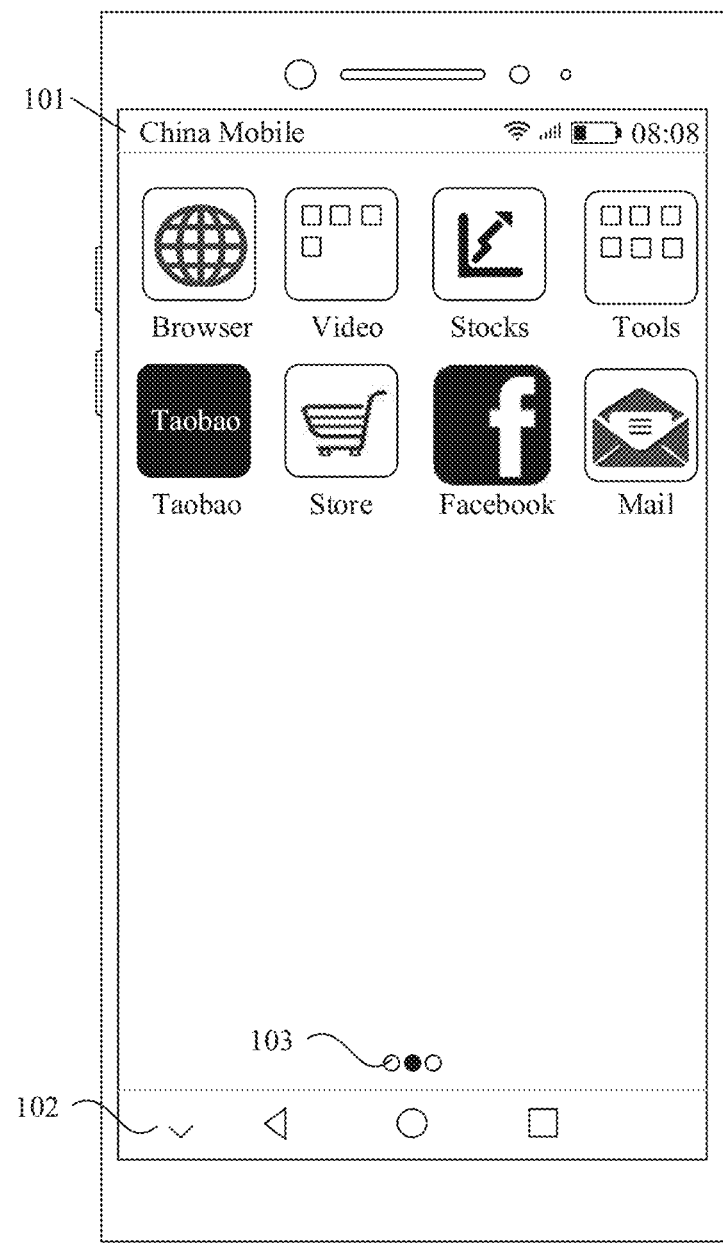
Figure 1C:
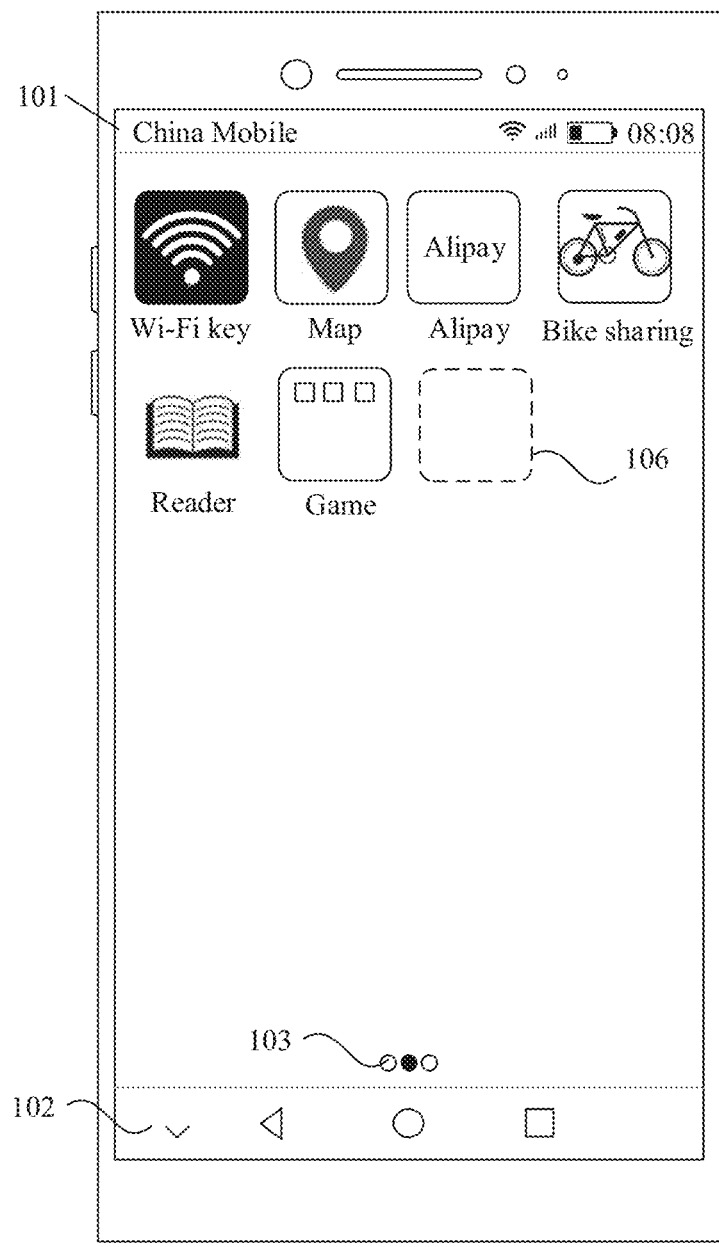

For example, FIG. 1(a) to FIG. 1(c) are schematic diagrams of a series of interfaces displayed on the electronic device 100 (FIG. 1(a) to FIG. 1(c) are shown by using an example in which the electronic device 100 is a mobile phone) according to this embodiment. These interfaces each are the home screen of the electronic device 100. Usually, because a size of a touchscreen of the electronic device 100 is fixed, only a limited quantity of controls can be displayed on the touchscreen of the electronic device 100. Therefore, when there are too many controls on the home screen of the electronic device 100, the home screen of the electronic device 100 may be divided into a plurality of sub-screens. For example, an interface displayed in FIG. 1(a) may be referred to as a first sub-screen (the first sub-screen) of the home screen. An interface displayed in FIG. 1(b) may be referred to as a second sub-screen (the second sub-screen) of the home screen. An interface displayed in FIG. 1(c) may be referred to as a third sub-screen (the third sub-screen) of the home screen. Each sub-screen may include different controls. As shown in FIG. 1(a) to FIG. 1(c), each sub-screen may include a status bar 101, a navigation bar 102 that can be hidden, a home screen indicator 103, and various icons. The home screen indicator 103 is used to prompt the user of a specific sub-screen that is currently displayed. Various icons may include an application icon and a folder icon on the electronic device 100. For example, the electronic device 100 includes applications such as WeChat, Twitter (Twitter), a browser, a calculator, an email, weather, and Alipay. As shown in FIG. 1(a), the first sub-screen includes nine icons: a camera icon, a gallery icon, a Weibo icon, a settings icon, a calculator icon, a weather icon, a WeChat icon, a Twitter icon, and a "Finance" folder icon 104. As shown in FIG. 1(b), the second sub-screen includes eight icons: a browser icon, a "Video" folder icon, a stock icon, a "Tools" folder icon, a Taobao icon, a store icon, a Facebook (Facebook) icon, and an email icon. As shown in FIG. 1(c), the third sub-screen includes six icons: a Wi-Fi key icon, a map icon, an Alipay icon, a bicycle sharing icon, a reader icon, and a "Game" folder icon. It may be understood that, in some embodiments, the home screen may further include a dock bar, and the dock bar may include icons of commonly used applications and the like.

A folder corresponding to the folder icon in this embodiment of this application may include one or more application icons. After the user taps the folder icon, the folder corresponding to the folder icon is opened, and the application icons included in the folder are displayed. For example, a "Finance" folder is used as an example. After the user taps the "Finance" folder icon 104 shown in FIG. 1(a), the "Finance" folder is opened. In this case, the electronic device 100 may display an open window of the "Finance" folder, and the open window may include an icon of the Industrial and Commercial Bank of China and an icon of the Bank of China that are included in the "Finance" folder.

In the conventional technology, when the user newly installs an application on the electronic device, the electronic device usually displays an icon of the application at a vacant position on a last sub-screen of the home screen. For example, with reference to the example shown in FIG. 1(a), FIG. 1(b), and FIG. 1(c), when the user newly installs YouTube on the electronic device 100, the electronic device 100 displays an icon of YouTube at a vacant position on the third sub-screen shown in FIG. 1(c) (for example, a "vacant position" 106 shown in FIG. 1(c)). In this case, if the user wants to move the icon of YouTube to another sub-screen, the user needs to perform a relatively complex operation. However, according to the method provided in this embodiment of this application, after the user newly installs the application on the electronic device 100, the user can conveniently and quickly move the icon of the newly installed application to a target position. This greatly improves human-computer interaction performance.

In this embodiment of this application, the vacant position on the sub-screen may be a position that is on the sub-screen and that may be used to display (or referred to as store) an icon, where no icon is currently displayed at the position. For example, the first sub-screen shown in FIG. 1(a) includes a plurality of "vacant positions", and a "vacant position" 105 is one of the plurality of "vacant positions". For another example, the third sub-screen shown in FIG. 1(c) also includes a plurality of "vacant positions", and the "vacant position" 106 is one of the plurality of "vacant positions". Usually, the sub-screen of the home screen does not mark the vacant position, in other words, the sub-screen of the electronic device 100 does not display a dashed-line box of the "vacant position" shown in FIG. 1(a) and FIG. 1(c). Certainly, when all positions that are used to display icons and that are on the sub-screen display icons, the sub-screen includes no vacant position.

It should be noted that the electronic device 100 in this embodiment of this application may be a mobile phone, a tablet computer, a desktop computer, a laptop computer, a handheld computer, a notebook computer, a personal computer (personal computer, PC), a netbook, a cellular phone, a personal digital assistant (personal digital assistant, PDA), a wearable device (for example, a smartwatch), a smart household device (for example, an internet protocol television (internet protocol television, IPTV)), a vehicle-mounted computer, a game console, an augmented reality (augmented reality, AR) device/a virtual reality (virtual reality, VR) device, or the like. A specific form of the electronic device 100 in this embodiment is not specially limited.

The following describes the implementations of the embodiments of this application in detail with reference to accompanying drawings.

Figure 2:
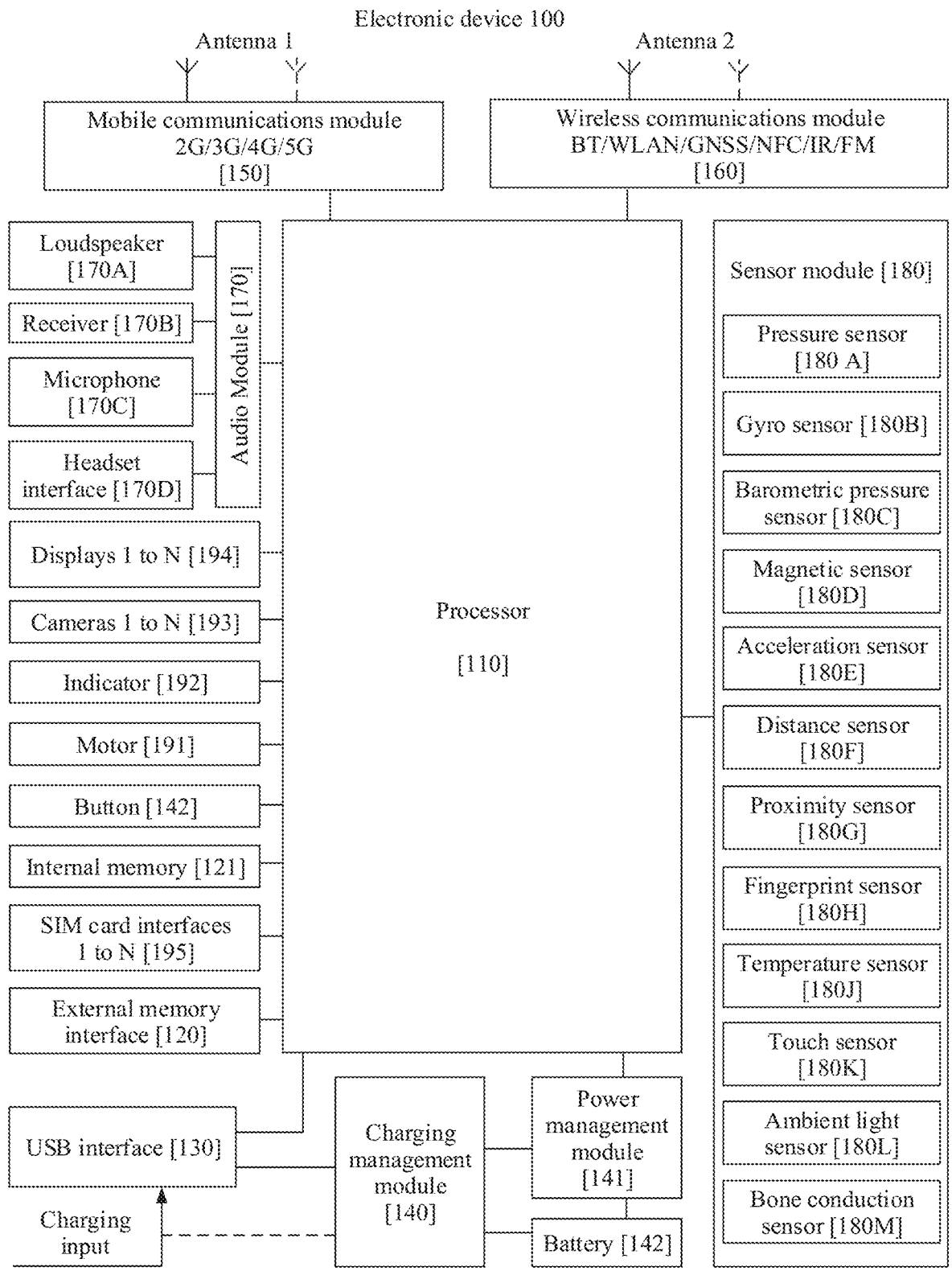
FIG. 2 is a schematic structural diagram of an electronic device according to an embodiment of this application.

FIG. 2 is a schematic structural diagram of an electronic device 100 according to an embodiment of this application.

As shown in FIG. 2, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments, the electronic device 100 may include more or fewer components than those shown in FIG. 2, or some components may be combined, or some components may be split, or different component arrangements may be used. The components shown in FIG. 2 may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a high-speed cache memory. The memory may store an instruction or data just used or cyclically used by the processor 110. If the processor 110 needs to use the instruction or the data again, the processor 110 may directly invoke the instruction or the data from the memory. This avoids repeated access, reduces a waiting time period of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit the audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component, for example, the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 by using the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured for data transmission between the electronic device 100 and a peripheral device, or may be configured to connect to a headset to play audio by using the headset. The interface may alternatively be configured to connect to another electronic device such as an AR device.

It may be understood that an interface connection relationship between the modules that is shown in this embodiment is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input from the wired charger through the USB interface 130. In some embodiments of wireless charging, the charging management module 140 may receive a wireless charging input by using a wireless charging coil of the electronic device 100. The charging management module 140 supplies power for the electronic device by using the power management module 141 while charging the battery 142.

The power management module 141 is configured to connect the battery 142 and the charging management module 140 to the processor 110. The power management module 141 receives input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna on the electronic device 100 may be configured to cover a single communications frequency band or a plurality of communications frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is for wireless communication including 2G/3G/4G/5G and the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrated into at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1. In this embodiment of this application, the display 194 may be configured to display sub-screens of the home screen of the electronic device 100, as shown in FIG. 1(*a*) to FIG. 1(*c*). Each sub-screen may include an application icon on the electronic device.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. In this way, the electronic device 100 can play or record videos in a plurality of encoding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, such as image identification, facial identification, speech identification, and text understanding, can be implemented by using the NPU.

The external memory interface 120 may be configured to connect to an external storage card such as a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the loudspeaker 170A.

The receiver 170B, also referred to as an "earpiece", is configured to convert an audio electrical signal into a sound signal. When the electronic device 100 answers a call or receives voice information, the receiver 170B may be placed close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170 C may be disposed on the electronic device 100. In some other embodiments, two microphones 170C may be disposed on the electronic device 100, to collect a sound signal and further implement a noise reduction function. In some other embodiments, three, four, or more microphones 170C may be alternatively disposed on the electronic device 100, to collect a sound signal, reduce noise, and further identify a sound source, implement a directional recording function, and the like.

The headset interface 170D is configured to connect to a wired headset. The headset interface 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines strength of the pressure based on the change of the capacitance. When a touch operation is performed on the display 194, the electronic device 100 detects strength of the touch operation by using the pressure sensor 180A. The electronic device 100 may also calculate a touch position based on a detection signal of the pressure sensor 180A. In some embodiments, touch operations that are performed at a same touch position but have different touch operation intensity may correspond to different operation instructions. For example, in this embodiment of this application, when a touch operation whose touch operation strength is less than a first pressure threshold is performed on an icon of an application, an instruction for displaying an interface of the application is executed. When a touch operation whose touch operation strength is greater than or equal to the first pressure threshold is performed on the icon of the application, an instruction for displaying a management menu is executed. The management menu may include an identifier of a sub-screen of the home screen of the electronic device 100 and/or an identifier of a folder included in a sub-screen, where the identifier of the sub-screen and the identifier of the folder are displayed around the icon of the application.

The gyro sensor 180B may be configured to determine a moving posture of the electronic device 100. In some embodiments, angular velocities of the electronic device 100 around three axes (namely, an x-axis, a y-axis, and a z-axis) may be determined by using the gyro sensor 180B. The gyro sensor 180B may be configured to perform image stabilization during photographing. For example, when the shutter is pressed, the gyro sensor 180B detects an angle at which the electronic device 100 shakes, calculates, based on the angle, a distance that needs to be compensated for a lens module, and enables the lens to cancel the shake of the electronic device 100 through reverse motion, so as to implement image stabilization. The gyro sensor 180B may be further used in navigation and motion sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a clamshell leather case by using the magnetic sensor 180D. In some embodiments, when the electronic device 100 is a clamshell machine, the electronic device 100 may detect opening and closing of the clamshell based on the magnetic sensor 180D. Further, a feature, for example, automatic unlocking of the clamshell is set based on a detected opening/closing state of the leather case or a detected opening/closing state of the clamshell.

The acceleration sensor 180E may detect magnitude of accelerations in various directions (usually on three axes) of the electronic device 100. When the electronic device 100 is static, a magnitude and a direction of gravity may be detected. The acceleration sensor 180E may be further configured to identify a posture of the electronic device, and is applied to applications such as landscape/portrait orientation switching and a pedometer.

The distance sensor 180F is configured to measure a distance. The electronic device 100 may measure the distance by using an infrared ray or a laser. In some embodiments, in a photographing scene, the electronic device 100 may use the distance sensor 180F to measure a distance to implement fast focusing.

The optical proximity sensor 180G may include a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, the electronic device 100 may determine that there is the object near the electronic device 101. When insufficient reflected light is detected, the electronic device 100 may determine that there is no object near the electronic device 100. The electronic device 100 may detect, by using the optical proximity sensor 180G, that the user holds the electronic device 100 close to an ear to make a call, so that the electronic device 100 automatically turns off the screen to save power. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint unlocking, accessing an application lock, fingerprint photographing, fingerprint call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is below another threshold, the electronic device 100 heats the battery 142 to prevent the electronic device 100 from abnormally shutting down due to the low temperature. In some other embodiments, when the temperature is below still another threshold, the electronic device 100 boosts an output voltage of the battery 142, to prevent abnormal shutdown caused by the low temperature.

The touch sensor 180K is also referred to as a "touch panel", The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may also be disposed on a surface of the electronic device 100 at a position different from a position of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in the headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive key input, generate key signal input related to user setting and function control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, a game, and the like) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded in the electronic device 100 and cannot be separated from the electronic device 100.

All methods in the following embodiments may be implemented on the electronic device 100 having the foregoing hardware structure.

In this embodiment of this application, if the user newly installs an application on the electronic device 100, after the installation of the application is completed, the electronic device 100 may display an icon of the application in a floating manner in a currently displayed interface. Alternatively, after the installation of the application is completed, the electronic device 100 may display a sub-screen that includes an icon of the application and that is on a home screen of the electronic device 100. Alternatively, after the installation of the application is completed, the electronic device 100 may display prompt information, and when detecting an operation performed by the user on the prompt information, the electronic device 100 may display a sub-screen that includes an icon of the application and that is on a home screen of the electronic device 100. In this way, the user can quickly find the icon of the newly installed application. If the user wants to move the icon of the newly installed application, the electronic device 100 may display a management menu. The management menu may include an identifier of a sub-screen of a home screen of the electronic device 100 that is displayed around the icon of the application and/or an identifier of a folder included in a sub-screen. In this way, the user only needs to select, in the management menu, an identifier of a sub-screen or a folder in which the icon of the application needs to be stored, so that the icon of the application can be moved to a corresponding position.

The following uses an example in which the electronic device 100 is a mobile phone to describe in detail the application icon moving method in the embodiments of this application with reference to FIG. 1(a), FIG. 1(b), and FIG. 1(c).

Figure 3:
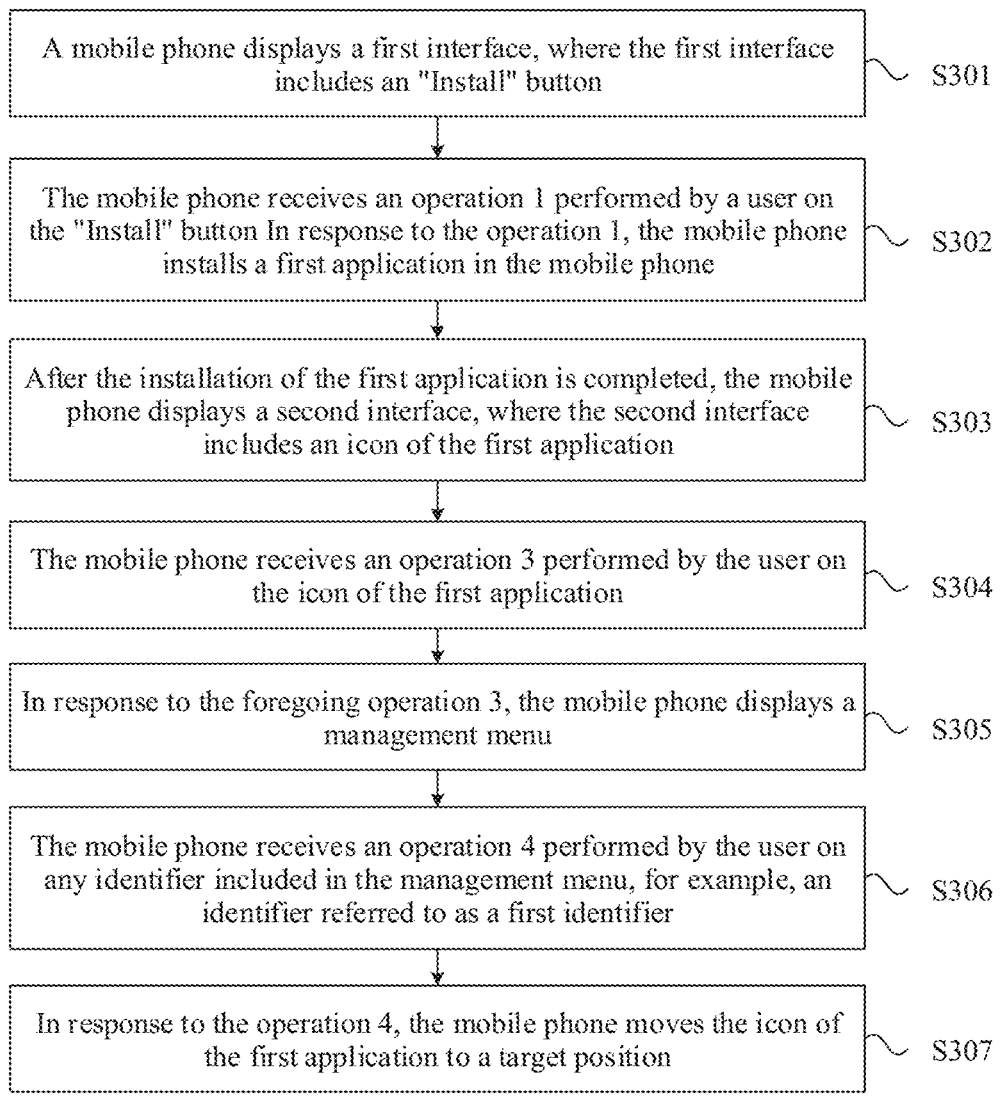
FIG. 3 is a schematic flowchart of an application icon moving method according to an embodiment of this application.

FIG. 3 is a schematic flowchart of an application icon moving method according to an embodiment of this application. As shown in FIG. 3, the method may include the following steps.

S301: A mobile phone displays a first interface, where the first interface includes an "Install" button.

It should be noted that the "Install" button may be a first button described in this application.

S302: The mobile phone receives an operation 1 performed by a user on the "Install" button. In response to the operation 1, the mobile phone installs a first application on the mobile phone.

The operation 1 may be a first operation in this application. The first interface may be an installation interface of the first application. The first application may be any downloadable application. The first interface may include the "Install" button. The "Install" button may be used to trigger the installation of the first application on the mobile phone. For example, when the user wants to install the first application on the mobile phone, the user may perform the operation 1 on the "Install" button included in the first interface, namely, the installation interface of the first application. In response to the operation 1, the mobile phone may install the first application on the mobile phone.

Figure 4:
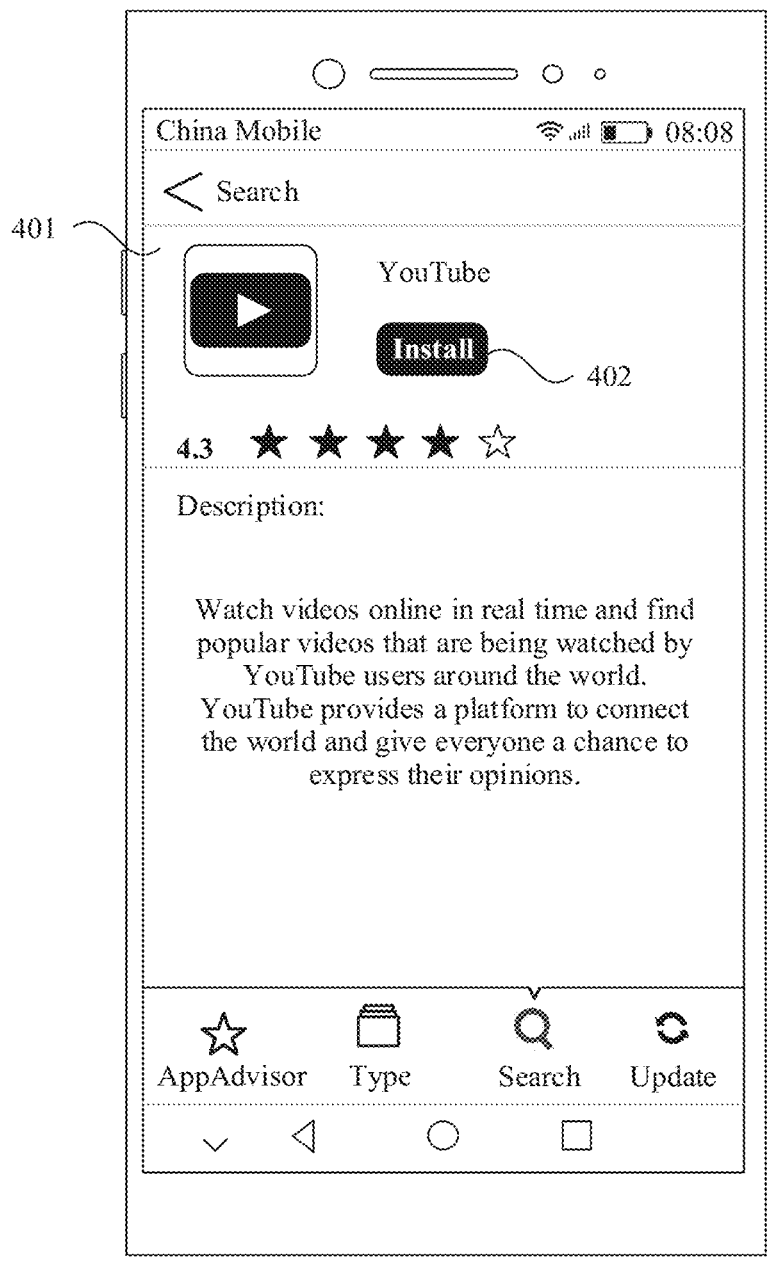
FIG. 4 is a schematic diagram of some other interfaces displayed on an electronic device according to an embodiment of this application.

For example, the mobile phone includes an application market, and the application market includes a plurality of downloadable applications. The user may select, in the application market of the mobile phone, an application that the user wants to install on the mobile phone. An example in which the first application is YouTube is used. If the user wants to install YouTube on the mobile phone, the user can search for YouTube in the application market of the mobile phone. As shown in FIG. 4, the mobile phone may display the first interface. For example, the mobile phone displays an installation interface 401 of YouTube. The installation interface 401 may include an "Install" button 402, a score given by a user to YouTube, an application introduction, and the like. The user may perform the operation 1 on the "Install" button 402. For example, the operation 1 may be a tap operation. In response to the tap operation, the mobile phone may download and install YouTube on the mobile phone.

In addition to selecting, in the application market, the application that the user wants to install on the mobile phone, in some embodiments, the user may further install, in another manner, an application that the user wants to use on the mobile phone, for example, by scanning a QR code or tapping an installation link. When the user installs, in the another manner, the application that the user wants to use on the mobile phone, the first interface may be the same as the installation interface 401, or may be different from the installation interface 401. For example, when the user installs the first application on the mobile phone by scanning a QR code corresponding to the first application, the first interface may be an interface to which the mobile phone jumps after the user scans the QR code. For another example, when the user installs the first application on the mobile phone by tapping an installation link of the first application, the first interface may be an interface to which the mobile phone jumps after the user taps the installation link of the first application. A specific form of the first interface is not specifically limited in this embodiment of this application.

S303: After the installation of the first application is completed, the mobile phone displays a second interface, where the second interface includes an icon of the first application.

To help the user quickly find the icon of the newly installed first application, after the installation of the first application is completed, the mobile phone may display the second interface including the icon of the first application.

For example, in this embodiment of this application, a specific implementation in which the mobile phone displays the second interface including the icon of the first application may be as follows:

Implementation 1: The mobile phone displays the icon of the first application in the second interface in a floating manner.

In some embodiments, after the installation of the first application is completed, the mobile phone may still display the first interface. In this case, the second interface is the first interface. In some other embodiments, in a process of installing the first application, the mobile phone may jump from the first interface to another interface in response to an operation of the user. In this case, the second interface is the another interface to which the mobile phone jumps, and is different from the first interface. For example, the second interface may be another interface of the application market, or may be an interface of another application other than the application market, or may be any sub-screen of a home screen of the mobile phone. After the installation of the first application is completed, the mobile phone may display the icon of the first application in the second interface in the floating manner.

Figure 5:
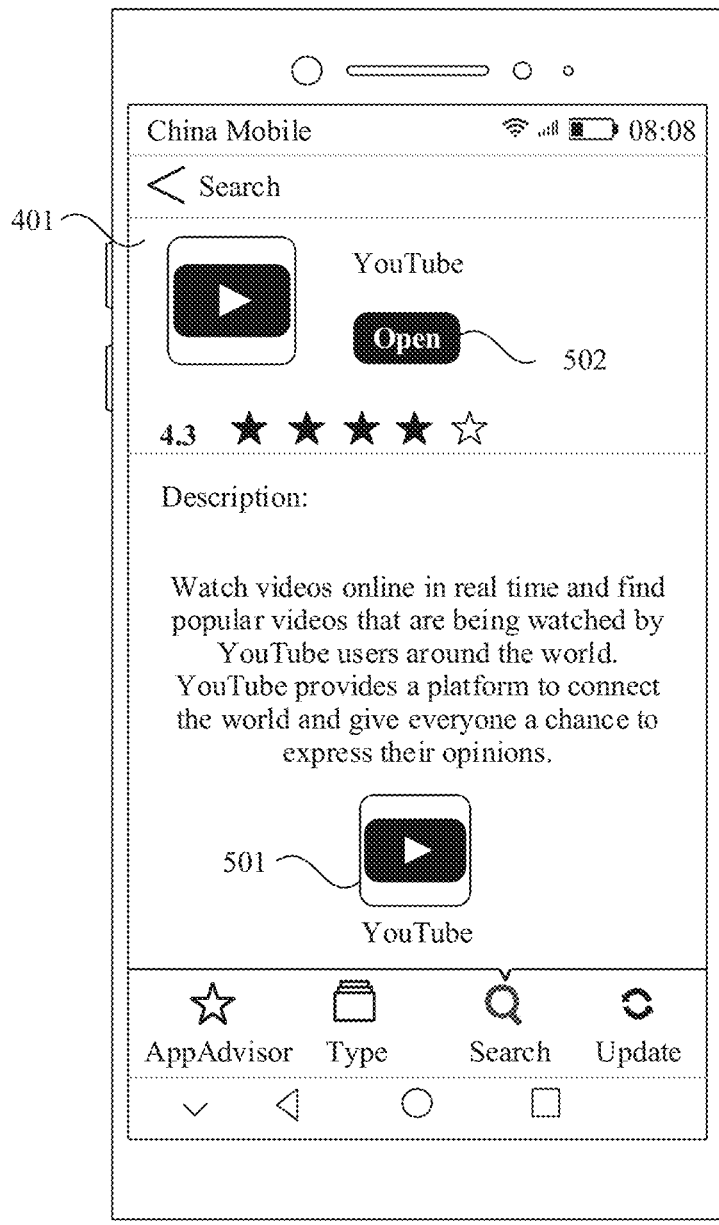
FIG. 5 is a schematic diagram of still other interfaces displayed on an electronic device according to an embodiment of this application.

For example, with reference to the example shown in FIG. 4, it is assumed that the mobile phone still displays the installation interface 401 of YouTube after the installation of YouTube is completed. In other words, in a process of installing YouTube, the user does not perform any operation of triggering the mobile phone to jump from the installation interface 401 of YouTube to another interface. In this case, the second interface is the installation interface 401 of YouTube. In this case, as shown in FIG. 5, after the installation of YouTube is completed, an icon 501 of YouTube may be displayed in the installation interface 401 of YouTube in the floating manner. It should be noted that, after the installation of YouTube is completed, the "Install" button 402 in the installation interface 401 shown in FIG. 4 may be updated to an "Open" button 502 in the installation interface 401 shown in FIG. 5. The user may open YouTube by tapping the "Open" button 502.

Figure 6:
FIG. 6 is a schematic diagram of still other interfaces displayed on an electronic device according to an embodiment of this application.

For another example, still with reference to the example shown in FIG. 4, it is assumed that in a process of installing YouTube, the user triggers, by performing an operation, the mobile phone to jump from the installation interface 401 of YouTube to another interface, for example, a WeChat interface 601 shown in FIG. 6. In this case, the second interface is the WeChat interface 601. As shown in FIG. 6, after the installation of YouTube is completed, an icon 602 of YouTube may be displayed in the WeChat interface 601 in the floating manner.

Figure 7:
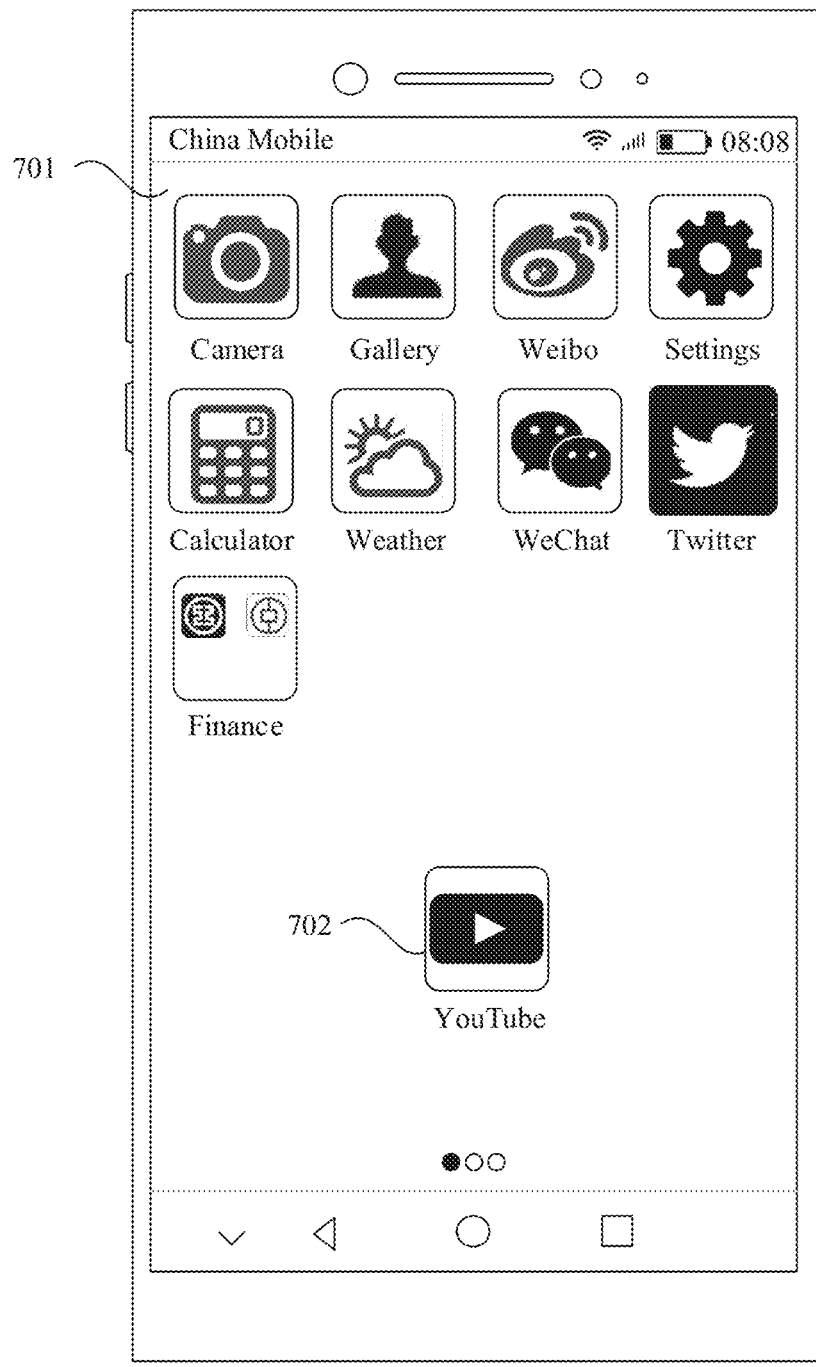
FIG. 7 is a schematic diagram of still other interfaces displayed on an electronic device according to an embodiment of this application.

For still another example, still with reference to the example shown in FIG. 4, it is assumed that in a process of installing YouTube, the user triggers, by performing an operation, the mobile phone to jump from the installation interface 401 of YouTube to another interface, for example, a first sub-screen 701 of the home screen of the mobile phone in FIG. 1(a), FIG. 1(b), FIG. 1(c), and FIG. 7. In this case, the second interface is the first sub-screen 701 of the home screen. As shown in FIG. 7, after the installation of YouTube is completed, an icon 702 of YouTube may be displayed on the first sub-screen 701 of the home screen in the floating manner.

Implementation 2: The mobile phone automatically displays a sub-screen of a home screen, and the icon of the first application is displayed at a vacant position on the sub-screen. In other words, the second interface is the sub-screen that is of the home screen of the mobile phone and that includes the icon of the first application.

After the installation of the first application is completed, the mobile phone may store the icon of the first application on a sub-screen of the home screen of the mobile phone. The sub-screen may be any sub-screen that has a vacant position and that is in sub-screens included in the home screen. If none of the sub-screens included in the home screen has a vacant position, the mobile phone may create a new sub-screen. In other words, the sub-screen is a newly created sub-screen. In this embodiment of this application, after the installation of the first application is completed, the mobile phone may store the icon of the first application at the vacant position on the sub-screen of the home screen, and display the sub-screen on which the icon of the first application is stored.

For example, that the mobile phone automatically displays the sub-screen on which the icon of the first application is stored may specifically include: If the mobile phone still displays the first interface after the installation of the first application is completed, after the installation of the first application is completed, the mobile phone may jump from the first interface to the sub-screen on which the icon of the first application is stored. In a process of installing the first application, if the mobile phone jumps from the first interface to another interface in response to an operation of the user, for example, another interface of the application market, an interface of another application other than the application market, or a sub-screen of the home screen, after the installation of the first application is completed, the mobile phone may jump from the another interface to the sub-screen on which the icon of the first application is stored. When the interface to which the mobile phone jumps is a sub-screen of the home screen, for example, the third sub-screen shown in FIG. 1(c), specially, if the mobile phone stores the icon of the first application at a vacant position on the third sub-screen, after the installation of the first application is completed, the mobile phone continues to display the third sub-screen, and does not need to jump.

With reference to FIG. 1(a), FIG. 1(b), and FIG. 1(c), the following uses an example in which after the installation of the first application is completed, the mobile phone stores the icon of the first application on the last sub-screen, namely, the third sub-screen, of the home screen of the mobile phone.

Figure 8A:
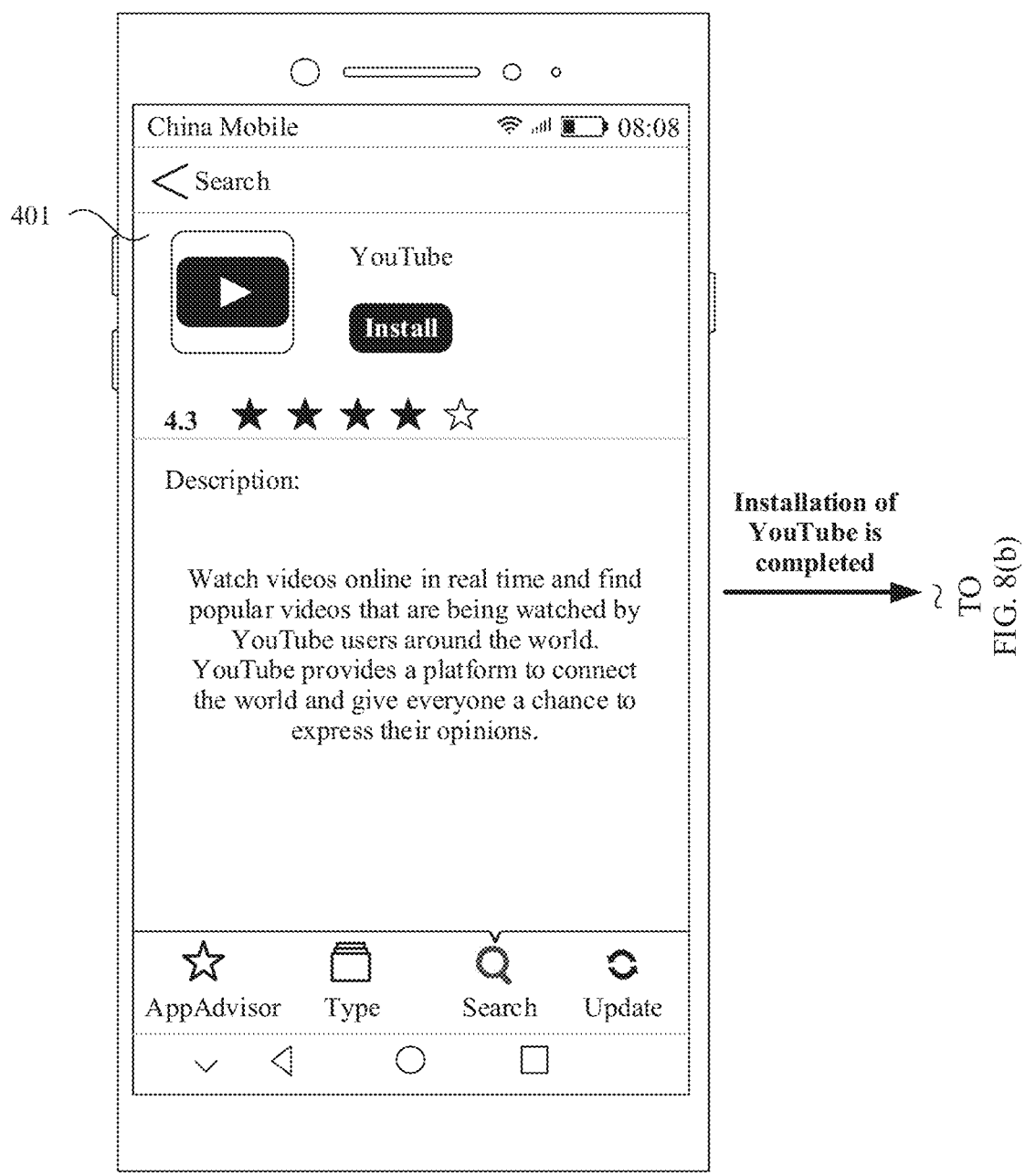
FIG. 8(a) and FIG. 8(b) are schematic diagrams of still other interfaces displayed on an electronic device according to an embodiment of this application.
Figure 8B:
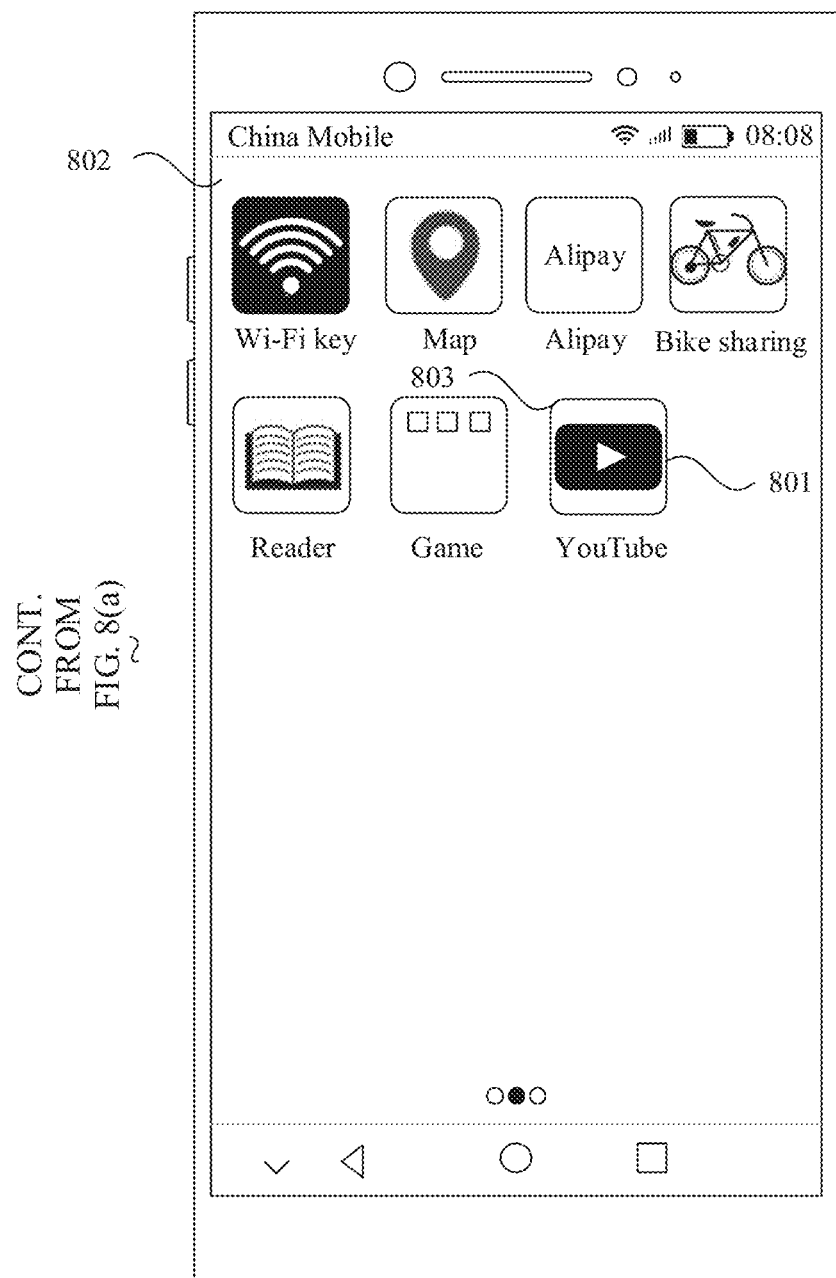

For example, still with reference to the example shown in FIG. 4, it is assumed that the mobile phone still displays the installation interface 401 of YouTube after the installation of YouTube is completed. In this case, as shown in FIG. 8(b), after the installation of YouTube is completed, the mobile phone may store an icon 801 of YouTube at a vacant position 803 on a third sub-screen 802, and display the third sub-screen 802. That the mobile phone displays the third sub-screen 802 may be specifically that the mobile phone jumps from the installation interface 401 (as shown in FIG. 8(a)) of YouTube to the third sub-screen 802 (as shown in FIG. 8(b)).

Figure 9A:
FIG. 9(a) and FIG. 9(b) are schematic diagrams of still other interfaces displayed on an electronic device according to an embodiment of this application.
Figure 9B:
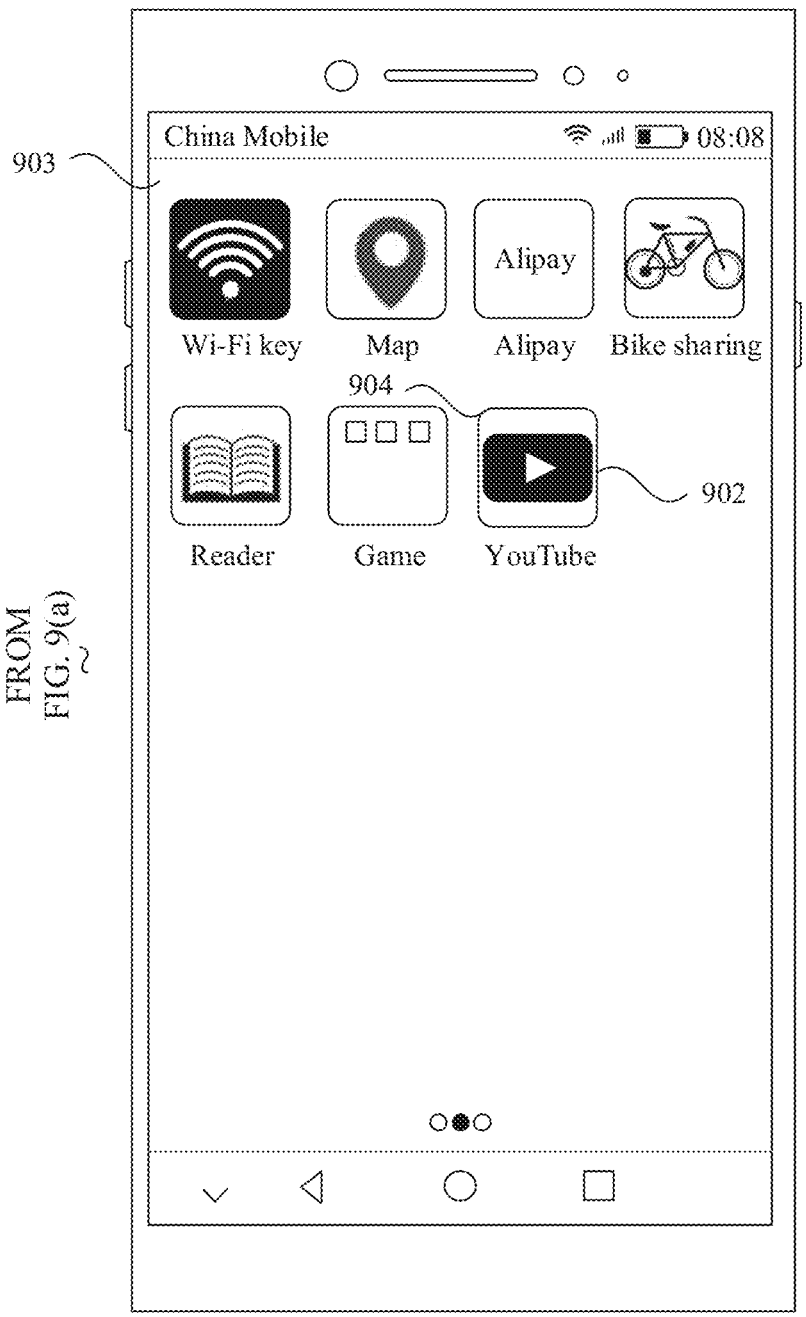

For another example, still with reference to the example shown in FIG. 4, it is assumed that in a process of installing YouTube, the user triggers, by performing an operation, the mobile phone to jump from the installation interface 401 of YouTube to another interface, for example, a WeChat interface 901 shown in FIG. 9(a). In this case, as shown in FIG. 9(b), after the installation of YouTube is completed, the mobile phone may store an icon 902 of YouTube at a vacant position 904 on a third sub-screen 903, and display the third sub-screen 903. That the mobile phone displays the third sub-screen 903 may be specifically that the mobile phone jumps from the WeChat interface 901 (as shown in FIG. 9(a)) to the third sub-screen 903 (as shown in FIG. 9(b)).

Figure 10A:
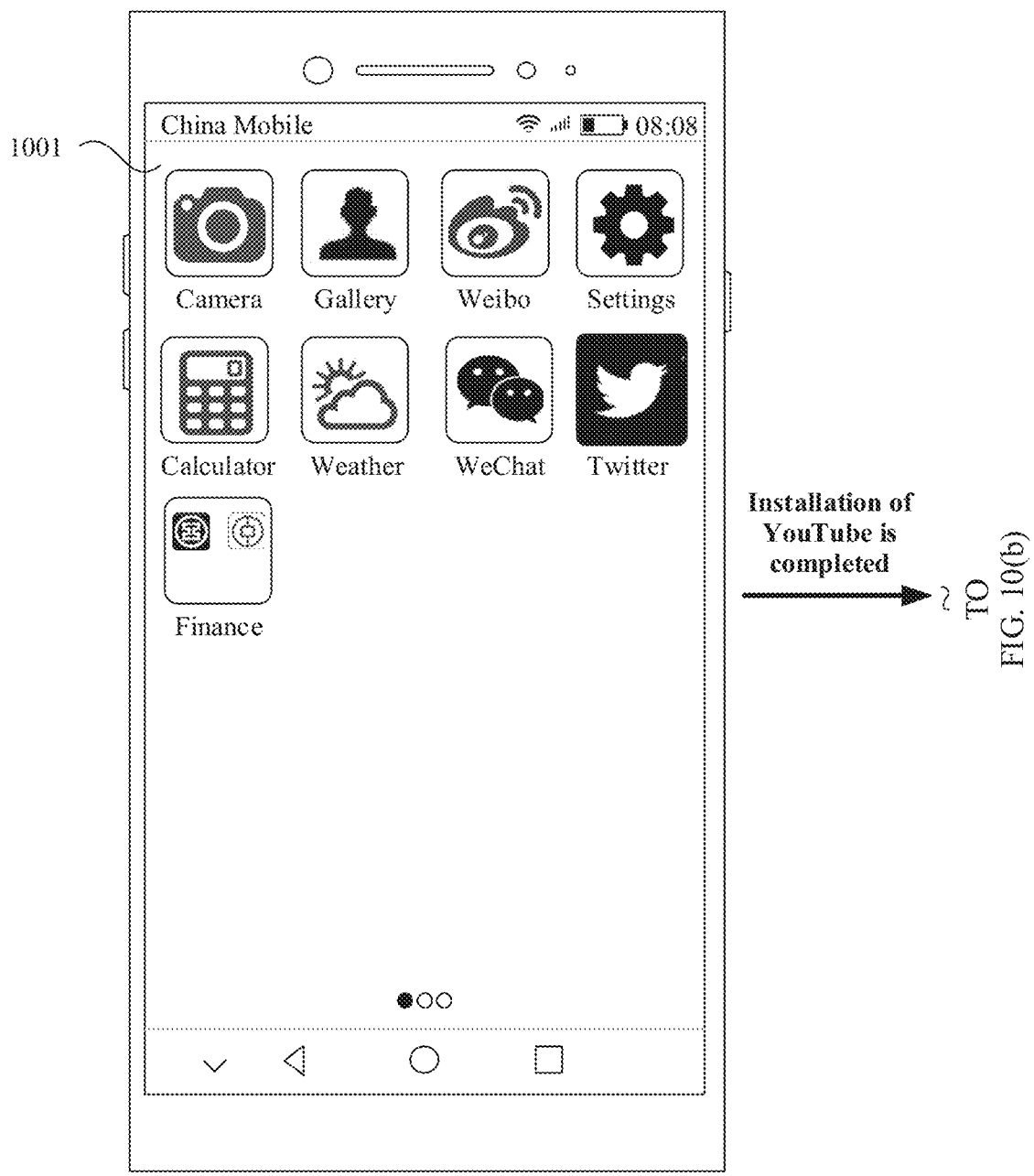
FIG. 10(a) and FIG. 10(b) are schematic diagrams of still other interfaces displayed on an electronic device according to an embodiment of this application.
Figure 10B:
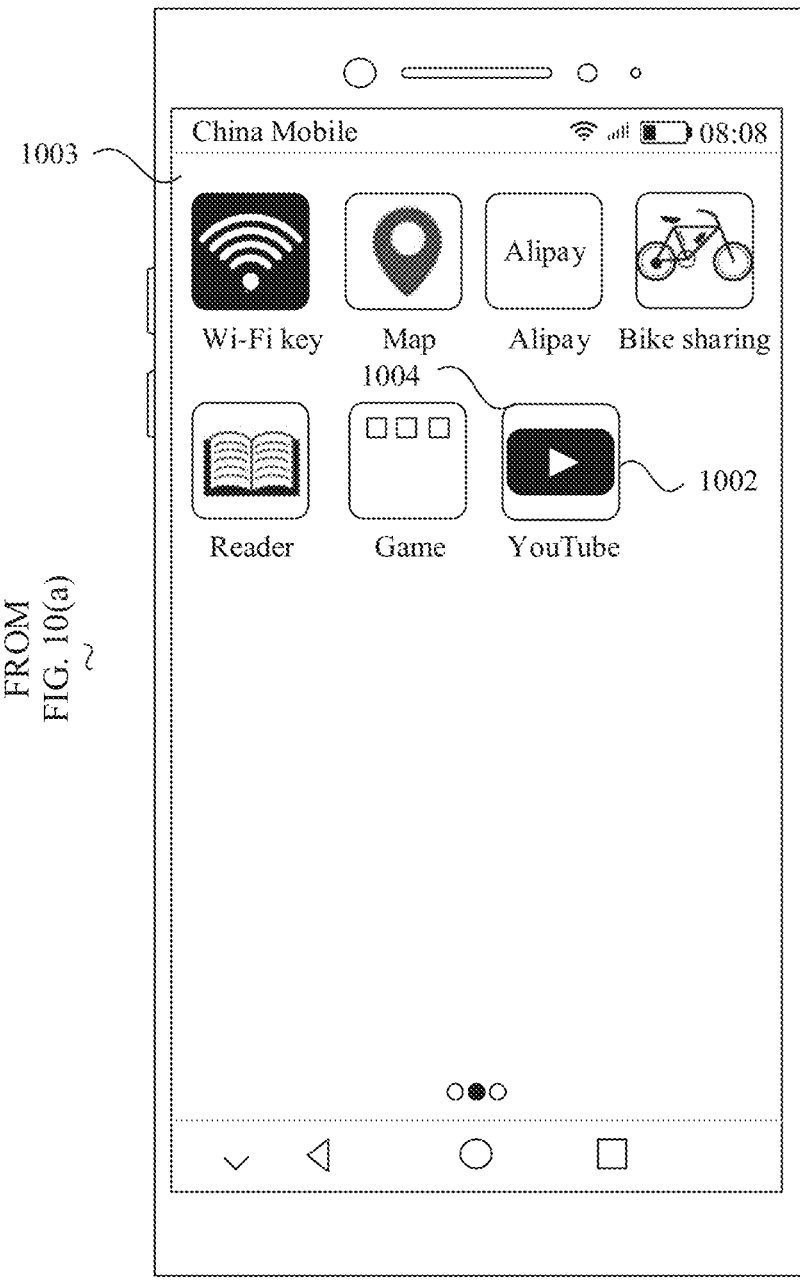

For still another example, still with reference to the example shown in FIG. 4, it is assumed that in a process of installing YouTube, the user triggers, by performing an operation, the mobile phone to jump from the installation interface 401 of YouTube to another interface, for example, a first sub-screen 1001 of the home screen of the mobile phone in FIG. 1(a), FIG. 1(b), FIG. 1(c), and FIG. 10(a). In this case, as shown in FIG. 10(b), after the installation of YouTube is completed, the mobile phone may store an icon 1002 of YouTube at a vacant position 1004 on a third sub-screen 1003, and display the third sub-screen 1003. That the mobile phone displays the third sub-screen 1003 may be specifically that the mobile phone jumps from the first sub-screen 1001 (as shown in FIG. 10(a)) to the third sub-screen 1003 (as shown in FIG. 10(b)).

Implementation 3: The mobile phone displays prompt information, and receives an operation 2 of the user. In response to the operation 2, the mobile phone displays a sub-screen of a home screen, and the icon of the first application is displayed at a vacant position on the sub-screen.

The prompt information may be used to prompt the user that the installation of the first application is completed. The operation 2 may be the fourth operation in this application. The operation 2 may be an operation used to trigger the mobile phone to display the sub-screen on which the icon of the first application is stored. For example, the operation 2 may be a tap operation performed by the user on the prompt information.

The implementation 3 is similar to the implementation 2, and a difference lies in that after the installation of the first application is completed, the mobile phone does not directly display the sub-screen on which the icon of the first application is stored. Instead, after the installation of the first application is completed, the mobile phone first displays the prompt information, to prompt the user that the installation of the first application is completed. If the user wants to view the icon of the first application, the user may perform the operation 2. Then, the mobile phone displays, in response to the operation 2, the sub-screen on which the icon of the first application is stored.

For example, that the mobile phone displays the prompt information may specifically include: If the mobile phone still displays the first interface after the installation of the first application is completed, after the installation of the first application is completed, the mobile phone may display the prompt information in the first interface. If the user wants to view the icon of the first application, the user may perform the operation 2, for example, perform the tap operation on the prompt information displayed in the first interface. In this way, in response to the tap operation, the mobile phone may jump from the first interface to the sub-screen on which the icon of the first application is stored. In a process of installing the first application, if the mobile phone jumps from the first interface to another interface in response to an operation of the user, after the installation of the first application is completed, the mobile phone may display the prompt information in the another interface. If the user wants to view the icon of the first application, the user may perform the operation 2, for example, perform the tap operation on the prompt information displayed in the another interface. In this way, in response to the tap operation, the mobile phone may jump from the another interface to the sub-screen on which the icon of the first application is stored.

Figures 11A, 11B:
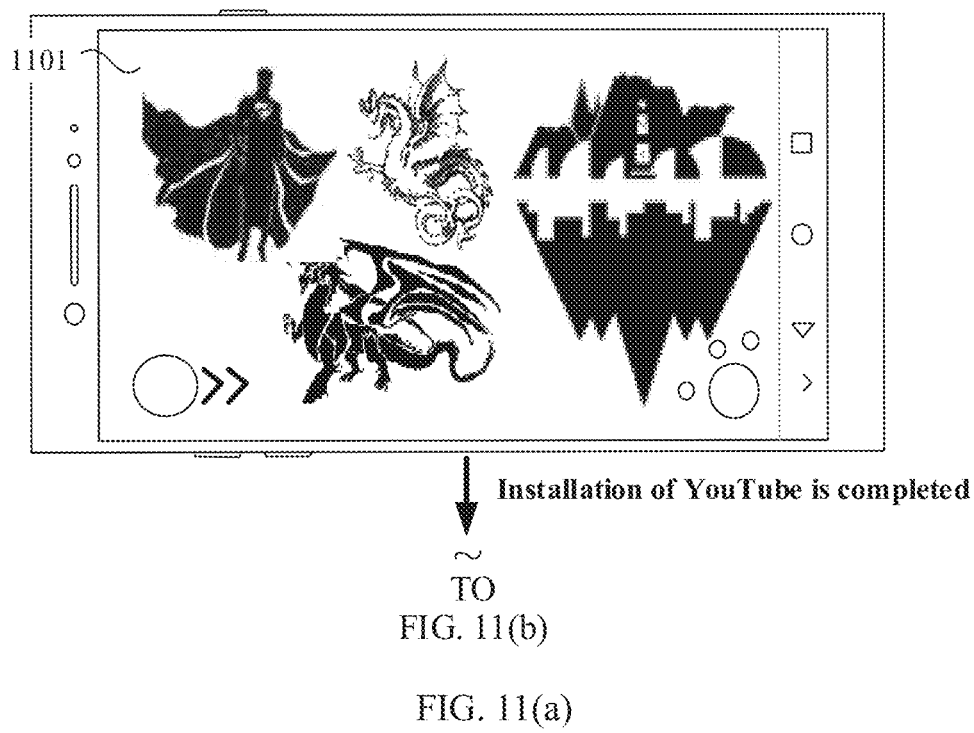
FIG. 11(a), FIG. 11(b), and FIG. 11(c) are schematic diagrams of still other interfaces displayed on an electronic device according to an embodiment of this application.
Figure 11B:
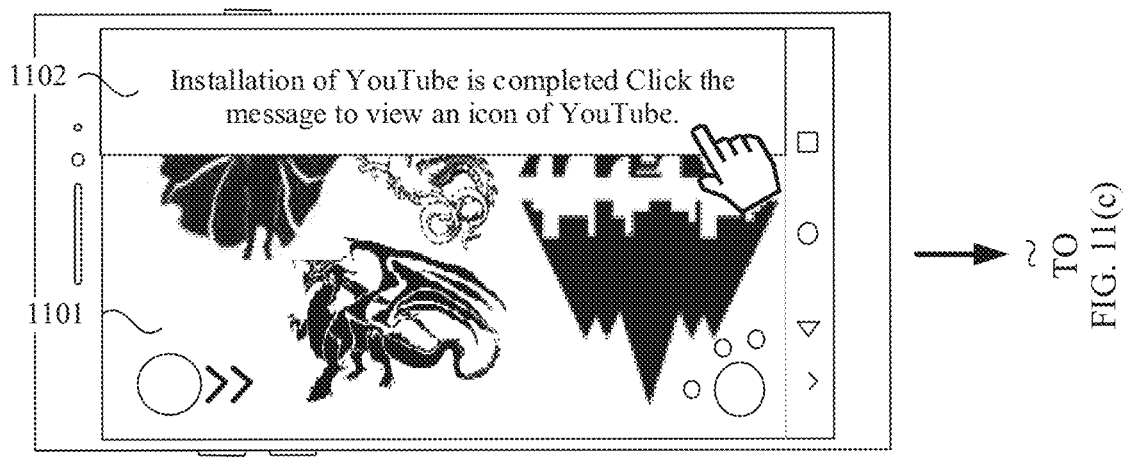
Figure 11C:
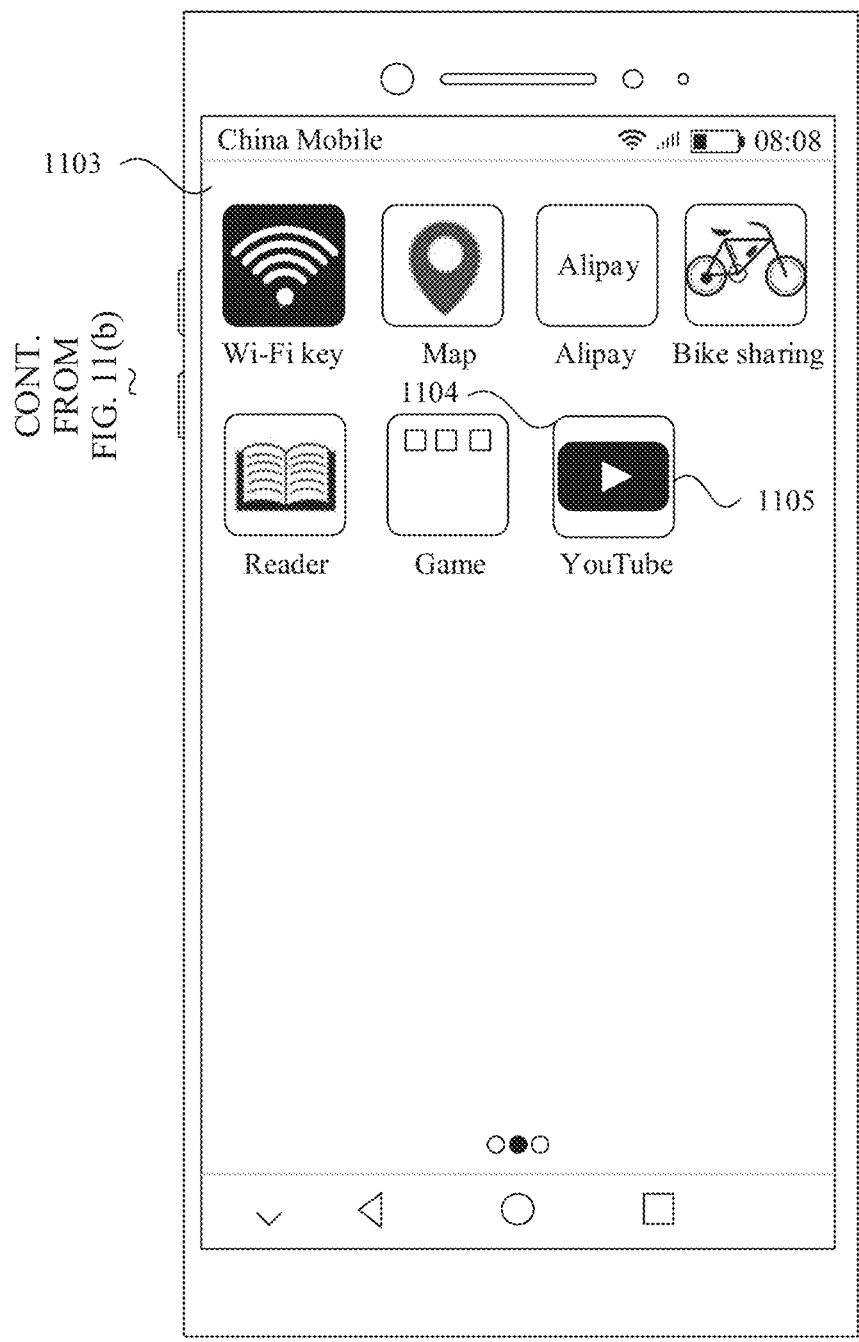

With reference to FIG. 1(a), FIG. 1(b), and FIG. 1(c), the following uses an example in which after the installation of the first application is completed, the mobile phone stores the icon of the first application on the last sub-screen, namely, the third sub-screen, of the home screen of the mobile phone. For example, still with reference to the example shown in FIG. 4, it is assumed that in a process of installing YouTube, the user triggers, by performing an operation, the mobile phone to jump from the installation interface 401 of YouTube to another interface, for example, a game interface 1101 shown in FIG. 11(a). In this case, as shown in FIG. 11(b), after the installation of YouTube is completed, the mobile phone may display prompt information 1102 in the game interface 1101, where the prompt information 1102 is used to prompt the user that the installation of YouTube is completed. If the user wants to view an icon of YouTube, the user may perform the operation 2, for example, perform a tap operation on the prompt information. As shown in FIG. 11(c), in response to the tap operation, the mobile phone may display a third sub-screen 1103. An icon 1105 of YouTube is displayed at a vacant position 1104 on the third sub-screen 1103. That the mobile phone displays the third sub-screen 1103 may be specifically that the mobile phone jumps from the game interface 1101 (as shown in FIG. 11(b)) to the third sub-screen 1103 (as shown in FIG. 11(c)).

S304: The mobile phone receives an operation 3 performed by the user on the icon of the first application.

The operation 3 may be the second operation described in this application. The operation 3 may be an operation used to trigger the mobile phone to display a management menu. The management menu may include an identifier of a sub-screen of the home screen and/or an identifier of a folder included in the sub-screen that are/is displayed around the icon of the first application. The operation 3 may be an operation different from an operation (for example, the tap operation) used to open the first application (for example, the foregoing YouTube). For example, the operation 3 may be any one of a touch-and-hold operation, a double-tap operation, and the like.

Figure 12A:
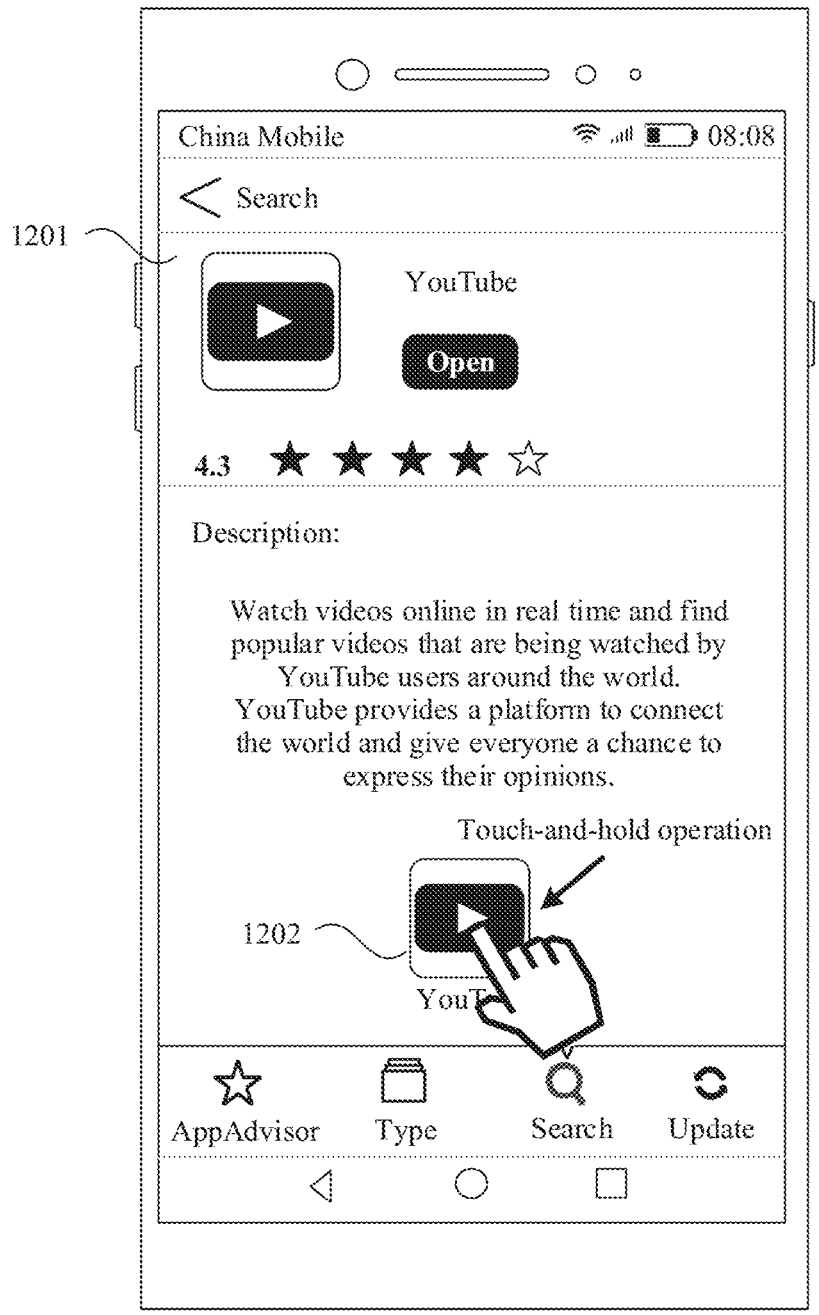
FIG. 12(a), FIG. 12(b), and FIG. 12(c) are schematic diagrams of still other interfaces displayed on an electronic device according to an embodiment of this application.
Figure 13A:
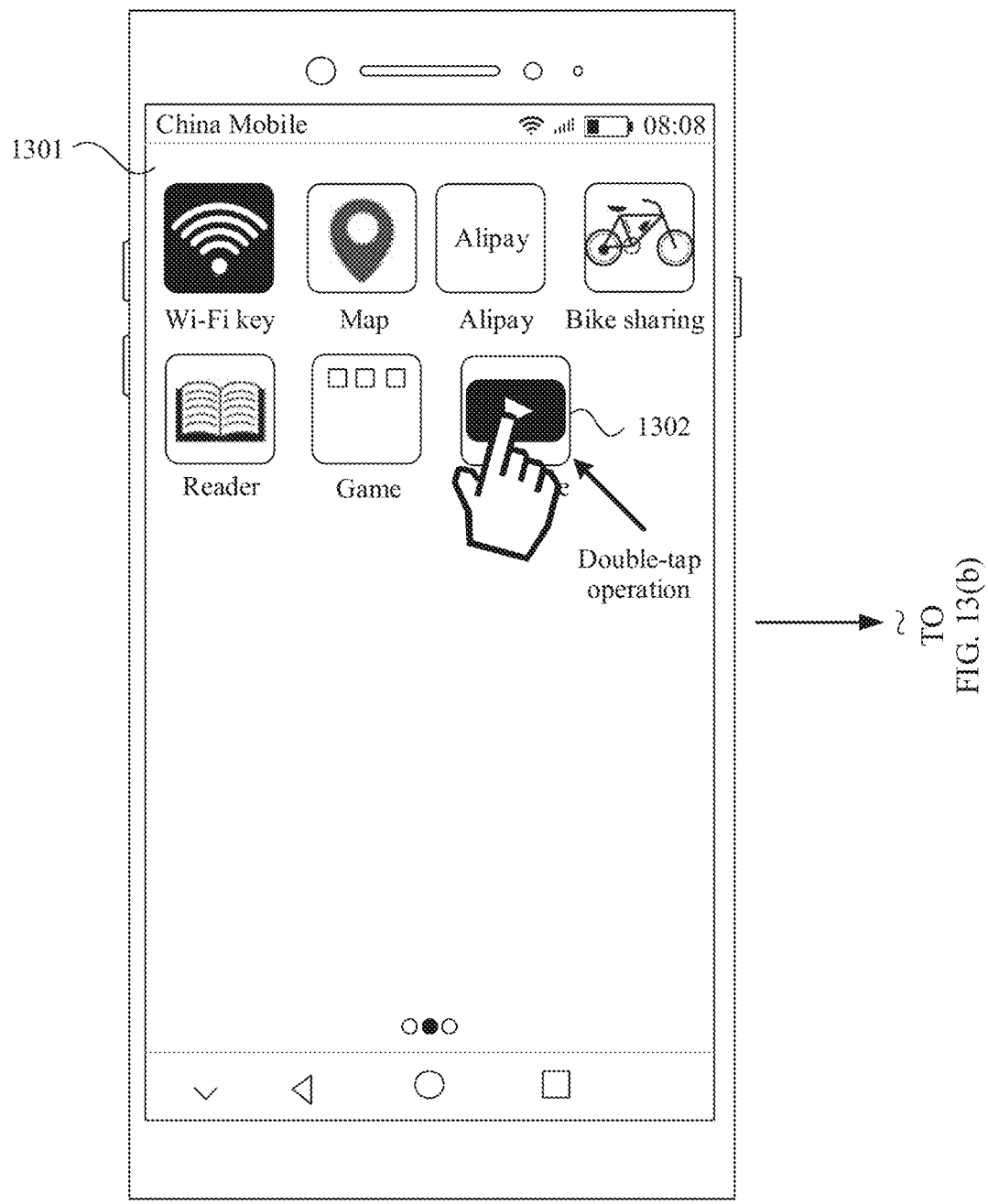
FIG. 13(a), FIG. 13(b), FIG. 13(c), and FIG. 13(d) are schematic diagrams of still other interfaces displayed on an electronic device according to an embodiment of this application.
Figure 13B:
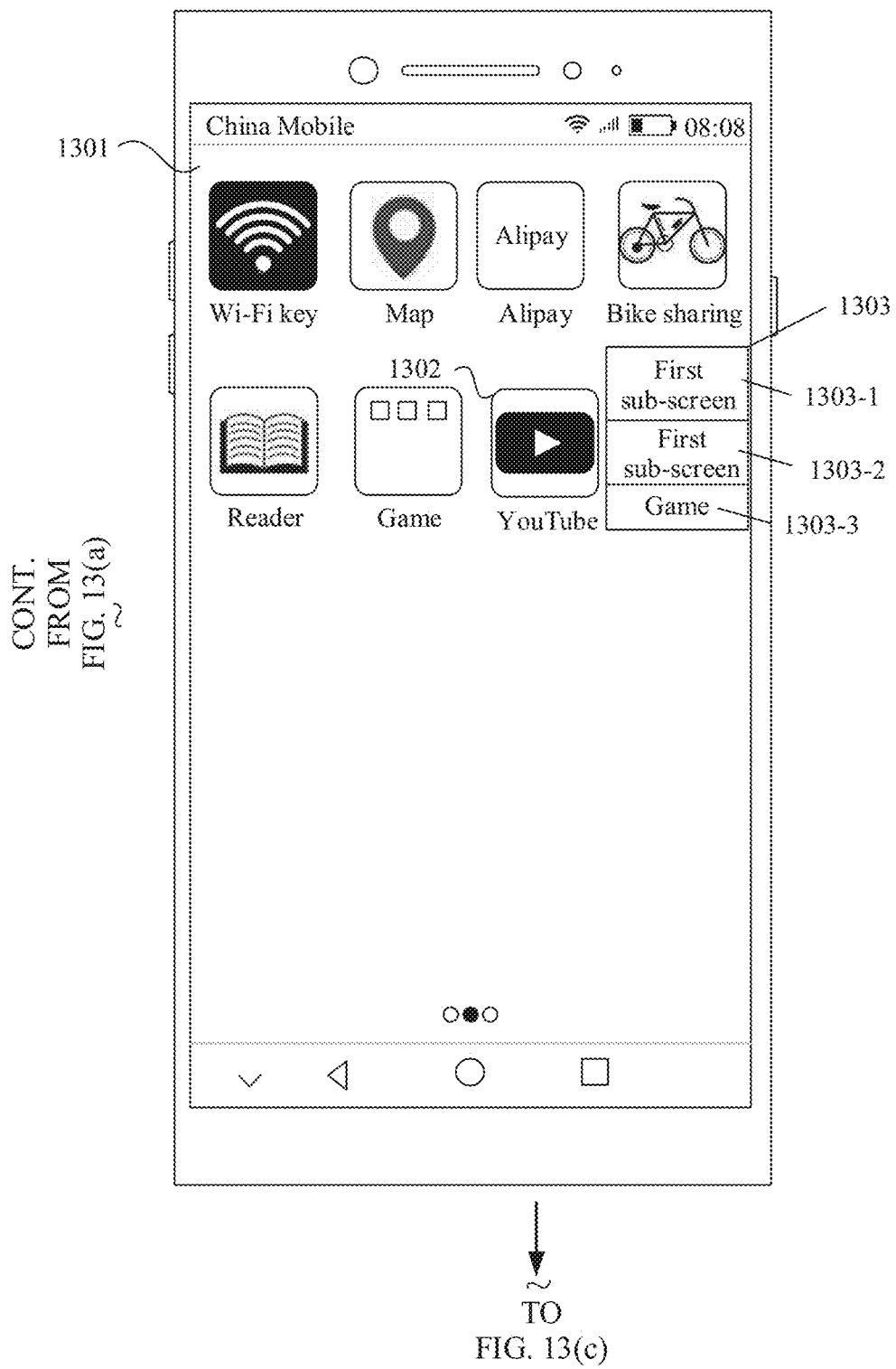
Figure 13C:
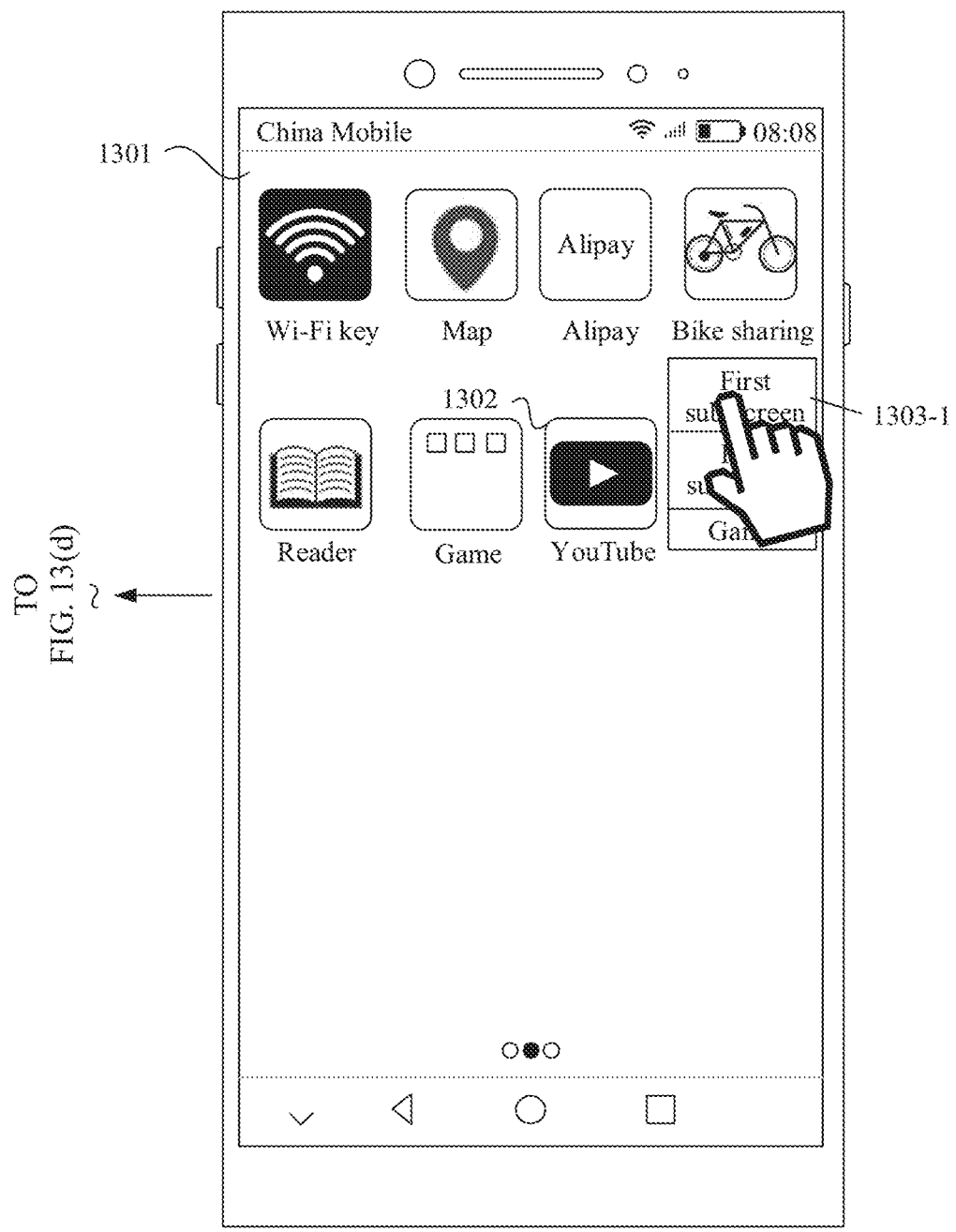
Figure 13D:
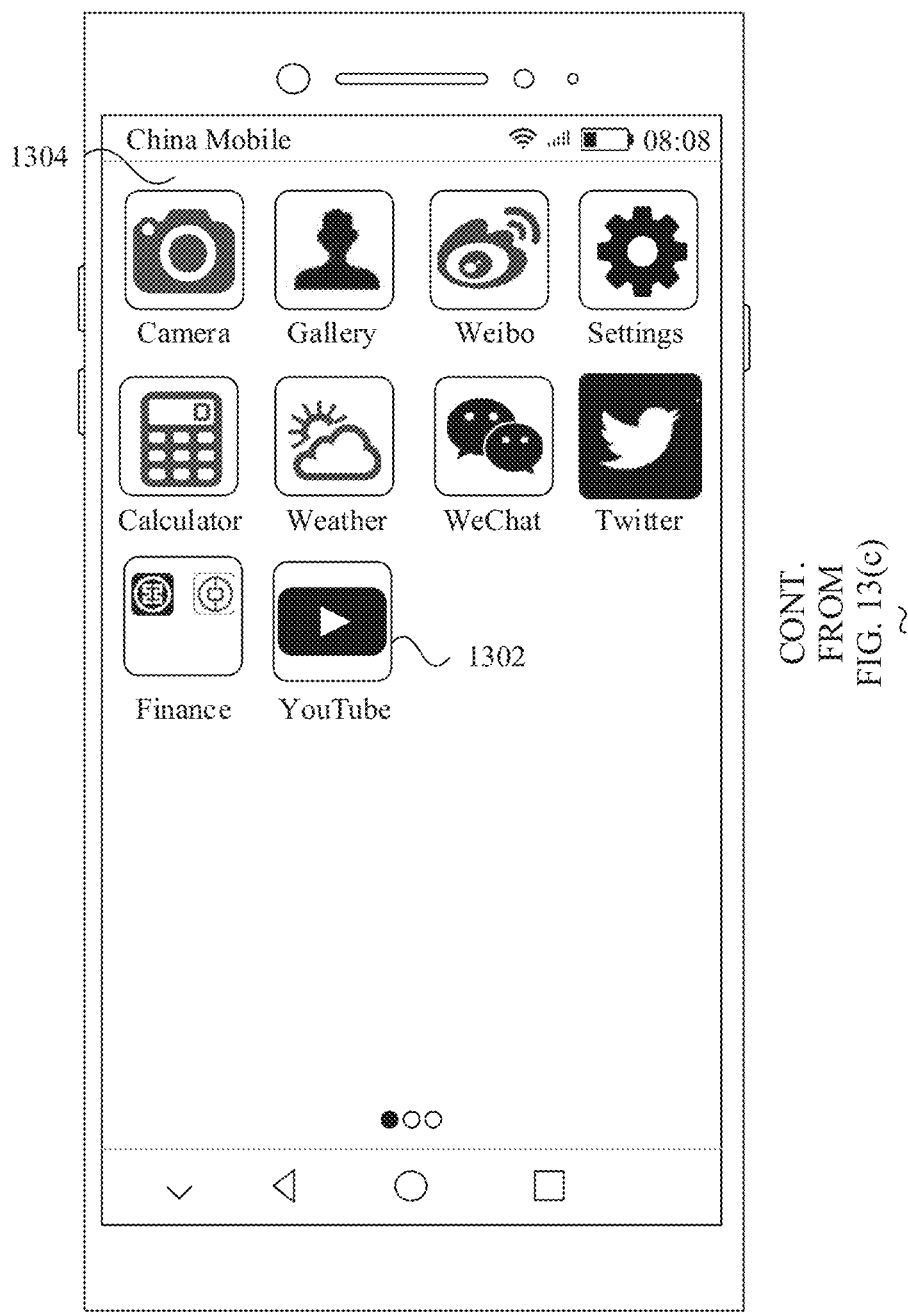
Figure 14A:
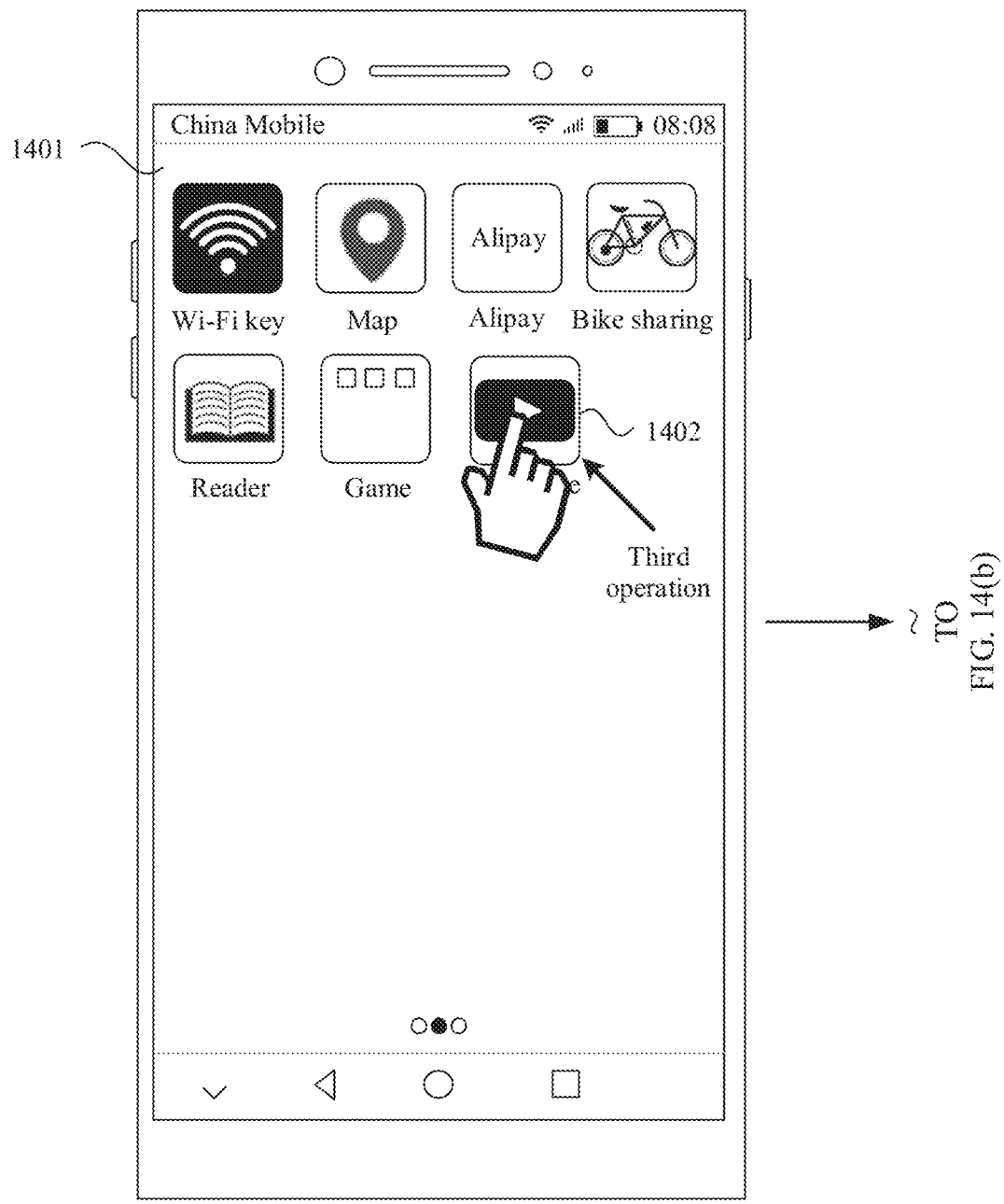
FIG. 14(a), FIG. 14(b), FIG. 14(c), and FIG. 14(d) are schematic diagrams of still other interfaces displayed on an electronic device according to an embodiment of this application.
Figure 14B:
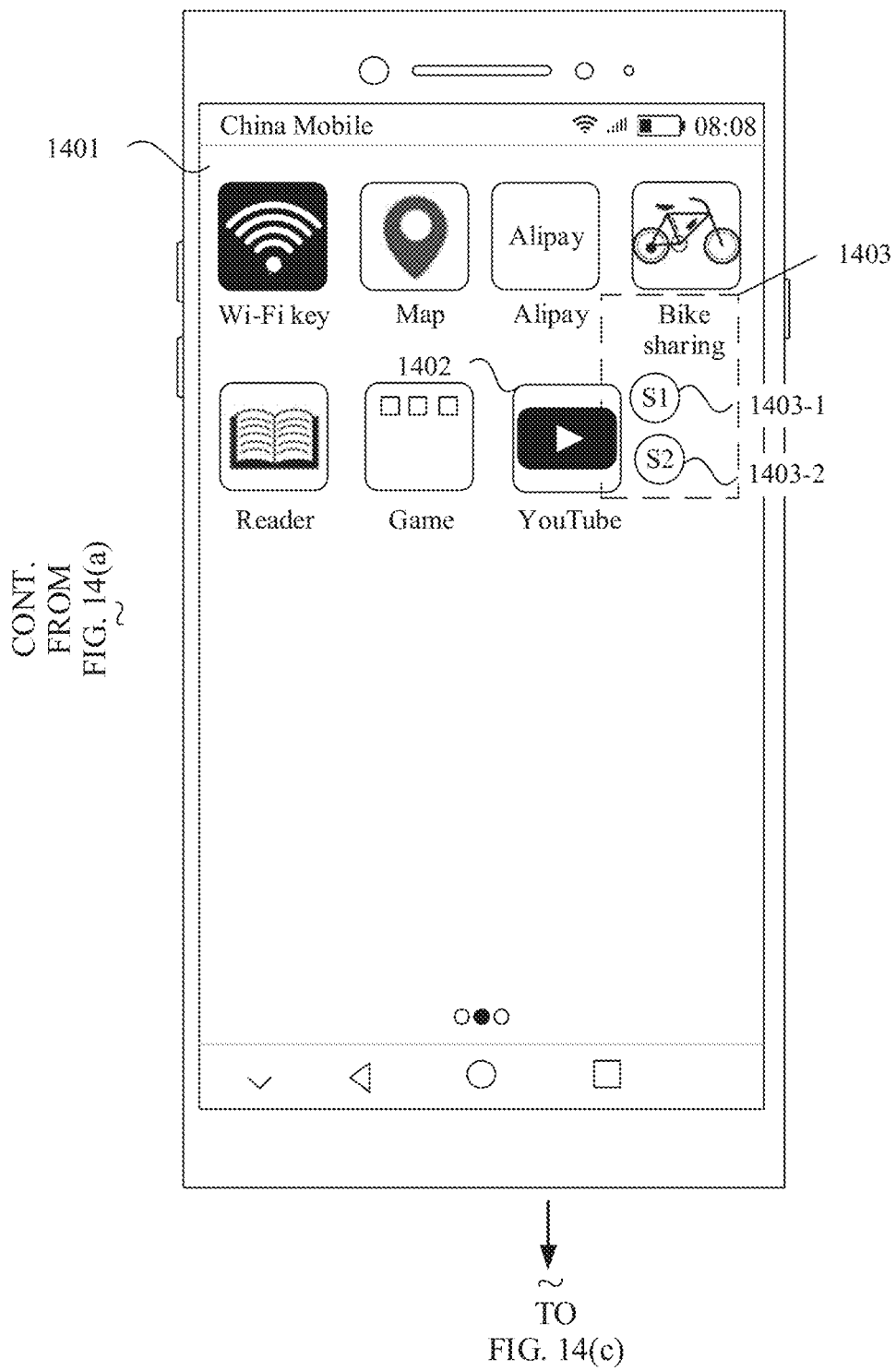
Figure 14C:
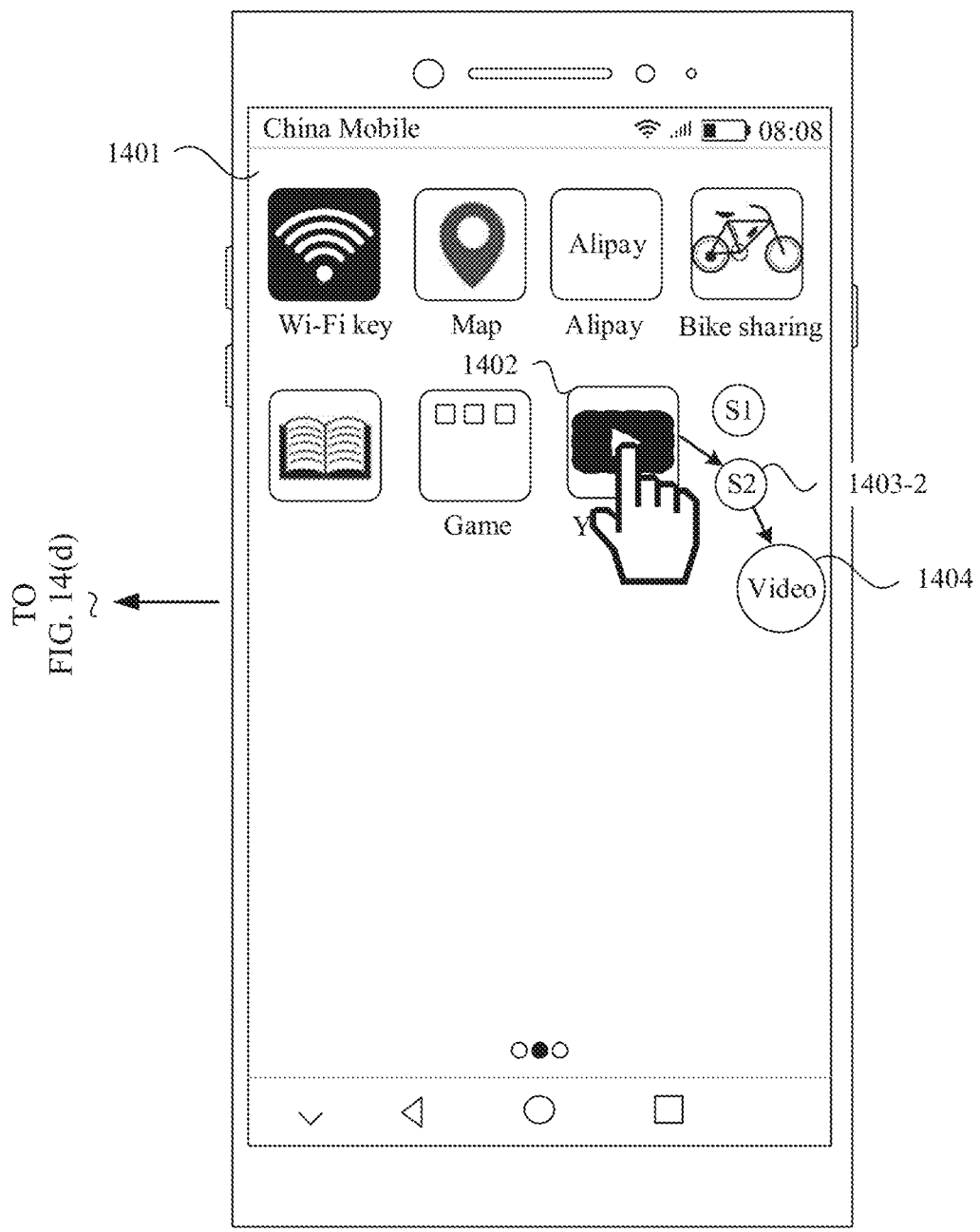
Figure 14D:
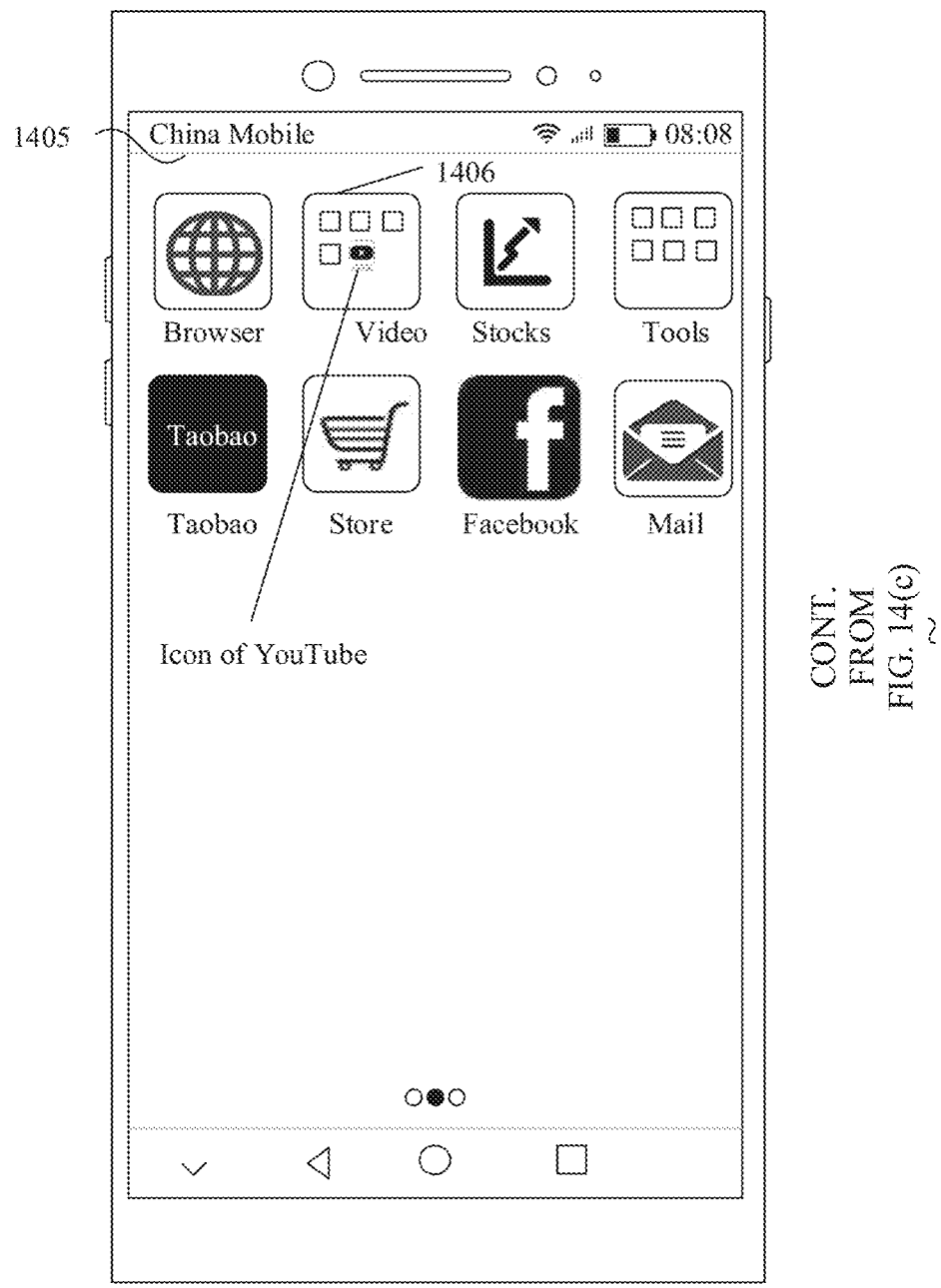

When the user wants to move the icon of the first application, the user may perform the operation 3 on the icon of the first application. For example, with reference to the description in the S303, the user may perform the operation 3 on the icon of the first application displayed in the floating manner in the second interface. For example, the operation 3 is a touch-and-hold operation. With reference to the example shown in FIG. 5, as shown in FIG. 12(a), the user may perform the touch-and-hold operation on an icon 1202 of YouTube displayed in an installation interface 1201 of YouTube in a floating manner. For another example, the user may perform the operation 3 on the icon that is of the first application and that is displayed in the sub-screen of the home screen. For example, the operation 3 is a double-tap operation. With reference to the example shown in FIG. 8(a) and FIG. 8(b), as shown in FIG. 13(a), the user may perform the double-tap operation on an icon 1302 of YouTube displayed in a third sub-screen 1301.

S305: In response to the operation 3, the mobile phone displays the management menu.

After the mobile phone receives the operation 3 of the user, in response to the operation 3, the mobile phone may display the management menu. The management menu is displayed around the icon of the first application, and the management menu may include one or more of the following identifiers: an identifier of a sub-screen, and an identifier of a folder included in a sub-screen.

For example, the icon of the first application is displayed in the second interface in the floating manner, and the management menu may include identifiers of all sub-screens of the home screen. For example, with reference to FIG. 1(a), FIG. 1(b), and FIG. 1(c), the management menu includes an identifier of the first sub-screen, an identifier of the second sub-screen, and an identifier of the third sub-screen.

Alternatively, the management menu may include identifiers of folders included in all sub-screens of the home screen. For example, with reference to FIG. 1(a), FIG. 1(b), and FIG. 1(c), the management menu includes an identifier of a "Finance" folder, an identifier of a "Video" folder, an identifier of a "Tools" folder, and an identifier of a "Game" folder.

Alternatively, the management menu may include identifiers of all sub-screens of the home screen and identifiers of folders included in all sub-screens. For example, with reference to FIG. 1(a), FIG. 1(b), and FIG. 1(c), the management menu includes the identifier of the first sub-screen, the identifier of the second sub-screen, the identifier of the third sub-screen, the identifier of the "Finance" folder, the identifier of the "Video" folder, the identifier of the "Tools" folder, and the identifier of the "Game" folder.

For another example, the icon of the first application is displayed at the vacant position on the sub-screen of the home screen, and the management menu may include identifiers of other sub-screens of the home screen. For example, with reference to FIG. 1(a), FIG. 1(b), and FIG. 1(c), if the icon of the first application displays at the vacant position on the third sub-screen, the management menu includes the identifier of the first sub-screen and the identifier of the second sub-screen.

Alternatively, the management menu may include identifiers of folders included in all sub-screens of the home screen. For example, with reference to FIG. 1(a), FIG. 1(b), and FIG. 1(c), the management menu includes the identifier of the "Finance" folder, the identifier of the "Video" folder, the identifier of the "Tools" folder, and the identifier of the "Game" folder.

Alternatively, the management menu may include identifiers of other sub-screens of the home screen and identifiers of folders included in all sub-screens. For example, with reference to FIG. 1(a), FIG. 1(b), and FIG. 1(c), if the icon of the first application displays at the vacant position on the third sub-screen, the management menu includes: the identifier of the first sub-screen, the identifier of the second sub-screen, the identifier of the "Finance" folder, the identifier of the "Video" folder, the identifier of the "Tools" folder, and the identifier of the "Game" folder.

Alternatively, the management menu may include identifiers of other sub-screens of the home screen, and an identifier of a folder included in a sub-screen in which the icon of the first application is stored. For example, with reference to FIG. 1(a), FIG. 1(b), and FIG. 1(c), if the icon of the first application displays at the vacant position on the third sub-screen, the management menu includes the identifier of the first sub-screen, the identifier of the second sub-screen, and the identifier of the "Game" folder (the "Game" folder is a folder included in the third sub-screen).

Alternatively, the management menu may include an identifier of a folder included in the sub-screen in which the icon of the first application is stored. For example, with reference to FIG. 1(a), FIG. 1(b), and FIG. 1(c), if the icon of the first application displays at the vacant position in the third sub-screen, the management menu includes the identifier of the "Game" folder.

It should be noted that, in this embodiment of this application, when the mobile phone receives the operation 3, the mobile phone may display the management menu according to any one of the foregoing solutions. For example, when receiving the operation 3, the mobile phone displays the management menu including identifiers of sub-screens of the home screen. For another example, when receiving the operation 3, the mobile phone displays the management menu including the identifier of the folder included in the sub-screen in which the icon of the first application is stored. Certainly, correspondences between different user operations and different display schemes may alternatively be predefined. For example, a displayed management menu corresponding to an operation A includes identifiers of all sub-screens of the home screen. A displayed management menu corresponding to an operation B includes an identifier of a folder included in the sub-screen in which the icon of the first application is stored. In other words, when the mobile phone receives the operation 3, if the operation 3 is the operation A, the management menu including the identifiers of all sub-screens of the home screen is displayed. If the operation 3 is the operation B, the management menu including the identifier of the folder included in the sub-screen in which the icon of the first application is stored is displayed.

In some embodiments, the identifier of the sub-screen may be an icon, a thumbnail, a name, or the like. The identifier of the folder may be a folder icon, a folder name, or the like.

In addition, in this embodiment of this application, the identifier (the identifier of the sub-screen, and/or the identifier of the folder included in the sub-screen) included in the management menu may be displayed around the icon of the first application.

In some embodiments, the identifiers included in the management menu may be displayed around the icon of the first application in a predefined order. For example, when the management menu includes the identifiers of the sub-screens, the identifiers of the sub-screens may be displayed in an order of the sub-screens on the home screen. For example, the identifier of the first sub-screen, the identifier of the second sub-screen, and the identifier of the third sub-screen are sequentially displayed clockwise around the icon of the first application. When the management menu includes the identifier of the folder included in the sub-screen, the identifier of the folder included in the first sub-screen, the identifier of the folder included in the second sub-screen, and the identifier of the folder included in the third sub-screen may be sequentially displayed clockwise around the icon of the first application. When the management menu includes the identifier of the sub-screen and the identifier of the folder included in the sub-screen, the identifier of the sub-screen may be first displayed and then the identifier of the folder included in the sub-screen may be displayed clockwise around the icon of the first application.

In some other embodiments, a display order of the identifiers included in the management menu may be determined based on a latest use time point of the user. For example, the management menu includes the identifier of the sub-screen. With reference to FIG. 1(a), FIG. 1(b), and FIG. 1(c), if a sub-screen recently used by the user (the recently used sub-screen may mean that the user recently moves an icon of an application to the sub-screen, or the user recently uses an application in the sub-screen) is the second sub-screen, the identifier of the second sub-screen is first displayed and then identifiers of other sub-screens are displayed clockwise around the icon of the first application.

In some other embodiments, the display order of the identifiers included in the management menu may be determined based on a type of the first application. In other words, an identifier of a sub-screen or a folder that includes an application having the same type as the first application is first displayed, and then another identifier is displayed. For example, the first application is YouTube, and the management menu includes the identifier of the folder included in the sub-screen. A type of YouTube may be a video application. In this case, with reference to FIG. 1(a), FIG. 1(b), and FIG. 1(c), the identifier of the "Video" folder (an application included in the "Video" folder is of a same type as the first application) may be first displayed and then an identifier of another folder may be displayed clockwise around the icon of YouTube.

In some other embodiments, the display order of the identifiers included in the management menu may be determined based on a migration habit of the user. In other words, the identifiers may be displayed in descending order of frequencies at which icons of applications are moved to the sub-screen or the folder. For example, the management menu includes the identifier of the sub-screen. The user often migrates an icon of an application to a sub-screen, in other words, a frequency at which the icon of the application is moved to the sub-screen is higher than a frequency at which the icon of the application is moved to another sub-screen. In this case, the identifier of the sub-screen is first displayed and then identifier of the another sub-screen is displayed clockwise around the icon of the first application.

It should be noted that, all identifiers that need to be included in the management menu may be displayed in the management menu after the operation 3 of the user is received. Alternatively, after the operation 3 of the user is received, some identifiers may be first displayed in the management menu, for example, identifiers of first N (for example, N=3, N=4) sub-screens or folders in a predefined order, and identifiers of first M (for example, M=3, M=4) sub-screens or folders recently used by the user. In addition, the management menu may further include an "Other" button. When the user taps the "Other" button, a remaining identifier may be displayed.

Figure 12B:
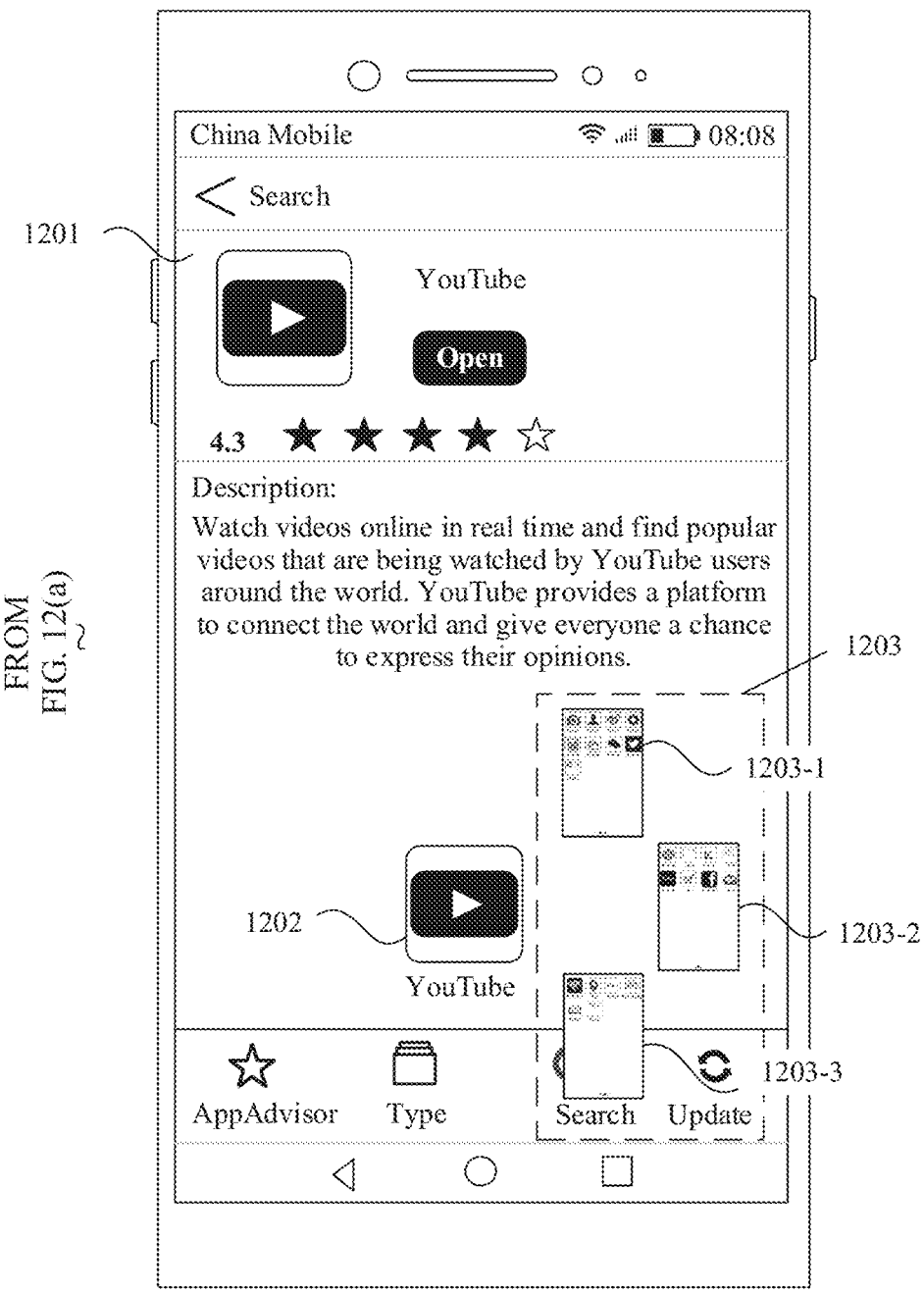
Figure 12C:
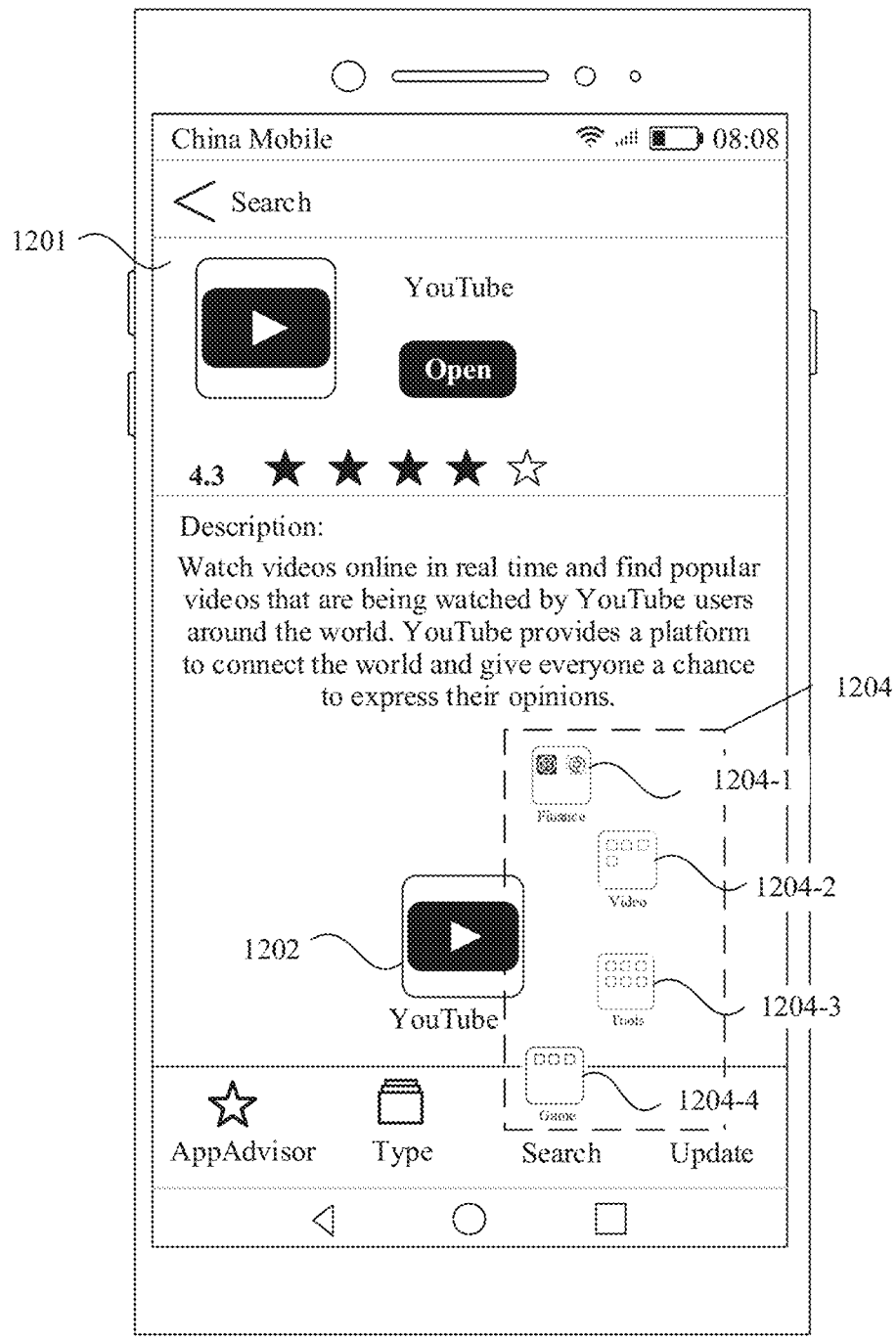

For example, with reference to FIG. 1(a), FIG. 1(b), and FIG. 1(c) and the example FIG. 12(a) in the S304, an example in which the management menu includes identifiers of all sub-screens of the home screen, the identifiers of the sub-screens are thumbnails, and the identifiers of the sub-screens are displayed in the predefined order is used. In response to the touch-and-hold operation performed by the user on the icon 1202 of YouTube shown in FIG. 12(a), as shown in FIG. 12(b), the mobile phone displays a management menu 1203. The management menu 1203 includes a thumbnail 1203-1 of the first sub-screen, a thumbnail 1203-2 of the second sub-screen, and a thumbnail 1203-3 of the third sub-screen. It can be seen that the thumbnail 1203-1, the thumbnail 1203-2, and the thumbnail 1203-3 are displayed around the icon 1202 of YouTube. Alternatively, an example in which the management menu includes identifiers of folders included in all sub-screens of the home screen, the identifiers of the folders are folder icons, and the identifiers of the folders are displayed in the predefined order is used. In response to the touch-and-hold operation performed by the user on the icon 1202 of YouTube shown in FIG. 12(*a*), as shown in FIG. 12(*c*), the mobile phone displays a management menu 1204. The management menu 1204 includes a folder icon 1204-1 of the "Financial" folder, a folder icon 1204-2 of the "Video" folder, a folder icon 1204-3 of the "Tools" folder, and a folder icon 1204-4 of the "Game" folder. It can be seen that the folder icon 1204-1, the folder icon 1204-2, the folder icon 1204-3, and the folder icon 1204-4 are displayed around the icon 1202 of YouTube.

For another example, with reference to FIG. 1(*a*), FIG. 1(*b*), and FIG. 1(*c*) and the example of FIG. 13(*a*) in the S304, an example in which the management menu includes identifiers of other sub-screens of the home screen and an identifier of a folder included in a sub-screen in which the icon of the first application is stored, where the identifiers of the sub-screens are names, the identifier of the folder is a folder name, and the identifiers of the sub-screen and the identifier of the folder are displayed in the predefined order is used. In response to a double-tapping operation performed by the user on the icon 1302 of YouTube shown in FIG. 13(*a*), as shown in FIG. 13(*b*), the mobile phone displays a management menu 1303. The management menu 1303 includes: a name 1303-1 of the first sub-screen, a name 1303-2 of the second sub-screen, and a name 1303-3 of the "Game" folder. It can be seen that the name 1303-1, the name 1303-2, and the name "Game" 1303-3 are displayed around the icon 1302 of YouTube.

It should be noted that the foregoing example is described by using an example in which the mobile phone displays only the management menu in response to the operation 3. In some embodiments, the management menu may alternatively be compatible with and simultaneously displayed with another shortcut command menu of the first application. For example, the shortcut menu is compatible and simultaneously displayed with another shortcut command menu of a 3D-touch in the icons of the applications.

S306: The mobile phone receives an operation 4 performed by the user on any identifier included in the management menu, for example, an identifier referred to as a first identifier.

The operation 4 may be the third operation in this application. The operation 4 may be a tap operation on any identifier (for example, the identifier of the sub-screen or the identifier of the folder) included in the management menu. The operation 4 may alternatively be a sliding operation. A start point of the sliding operation is the icon of the first application, and an end point of the sliding operation is any identifier included in the management menu. Alternatively, the start point of the sliding operation is any identifier included in the management menu, and an end point of the sliding operation is the icon of the first application. In some embodiments, if the operation 4 is the sliding operation, in a process in which the user performs the sliding operation, the mobile phone may move, with movement of a finger of the user, a control corresponding to the start position of the sliding operation, for example, the icon of the first application, or the identifier in the management menu.

S307: In response to the operation 4, the mobile phone moves the icon of the first application to a target position.

When the operation 4 is the tap operation, the target position is a sub-screen corresponding to an identifier (for example, the first identifier) tapped by the user, or a folder corresponding to an identifier (for example, the first identifier) tapped by the user. When the operation 4 is the sliding operation, if the start point of the sliding operation is the icon of the first application, and the end point of the sliding operation is the identifier (for example, the first identifier) in the management menu, the target position is a sub-screen corresponding to an identifier (for example, the first identifier) of the end point of the sliding operation, or a folder corresponding to an identifier (for example, the first identifier) of the end point of the sliding operation. When the operation 4 is the sliding operation, if the start point of the sliding operation is the identifier (for example, the first identifier) in the management menu, and the end point of the sliding operation is the icon of the first application, the target position is a sub-screen corresponding to an identifier (for example, the first identifier) of the start point of the sliding operation, or a folder corresponding to an identifier (for example, the first identifier) of the start point of the sliding operation. In other words, after receiving the operation 4 of the user, the mobile phone may move the icon of the newly installed first application to the target position, to complete moving of the application icon. For example, with reference to the example of FIG. 13(*b*) in the S305, an example in which the operation 4 is the tap operation is used. If the user wants to move the icon 1302 of YouTube to the first sub-screen, as shown in FIG. 13(*c*), the user may perform the tap operation on the icon 1303-1 of the first sub-screen. In response to the tap operation, the mobile phone moves the icon 1302 of YouTube to the first sub-screen 1304, as shown in FIG. 13(*d*).

In some other embodiments of this application, if the management menu includes an identifier of a sub-screen, and the sub-screen includes a folder, and if the user performs the operation 4, for example, taps the identifier of the sub-screen, or the end point of the sliding operation is the identifier of the sub-screen, the mobile phone may display the identifier of the folder included in the sub-screen. If the user wants to store the icon of the first application in the folder included in the sub-screen, the user may perform a fifth operation on the displayed identifier of the folder, for example, the tap operation, or continue to perform the sliding operation, where an end point of the sliding operation is the displayed identifier of the folder. For example, with reference to the example shown in FIG. 8(*a*) and FIG. 8(*b*), as shown in FIG. 14(*a*), the user may perform the operation 3 on an icon 1402 of YouTube displayed in the third sub-screen 1401. For example, the management menu includes identifiers of other sub-screens of the home screen, the identifiers of the sub-screens are icons, the identifiers of the sub-screens are displayed in the predefined order, and the operation 4 is the sliding operation. In response to the operation 3 performed by the user on the icon 1402 of YouTube, as shown in FIG. 14(*b*), the mobile phone displays a management menu 1403. The management menu 1403 includes an icon 1403-1 of the first sub-screen and an icon 1403-2 of the second sub-screen. If the user wants to move the icon 1402 of YouTube to the second sub-screen, as shown in FIG. 14(*c*), the user may perform a sliding operation 1 in which the icon 1402 of YouTube is used as the start point and the icon 1403-2 of the second sub-screen is used as the end point. As the finger of the user moves, the icon 1402 of YouTube may move along with the finger. Because the second sub-screen includes the "Video" folder, in response to the sliding operation 1, as shown in FIG. 14(*c*), the mobile phone displays an identifier (for example, a name) 1404 of the "Video" folder. If the user wants to store the icon 1402 of YouTube in the second sub-screen, the user may raise a finger at a display position of the icon 1403-2 of the second sub-screen. In this way, the mobile phone may move the icon 1402 of YouTube to a vacant position in the second sub-screen. If the user wants to store the icon 1402 of YouTube in the "Video" folder in the second sub-screen, the user may continue to perform the sliding operation 2, and the end point of the sliding operation 2 is the name 1404 of the "Video" folder. In this way, the mobile phone may move the icon 1402 of YouTube to the "Video" folder 1406 in the second sub-screen 1405, as shown in FIG. 14(*d*).

In addition, it should be noted that the foregoing embodiment is described by using an example in which the user manually installs the first application on the mobile phone, and the first application may also be automatically installed on the mobile phone. If the first application is automatically installed on the mobile phone, after the installation of the first application is completed, the icon of the first application may also be quickly moved by performing the S303 to the S307. Details are not described herein again in this embodiment of this application.

In this way, when the user wants to move the icon of the first application, the user may perform a corresponding operation on the icon of the first application. In response to the operation, the mobile phone may display the management menu including the identifier of the sub-screen and/or the identifier of the folder included in the sub-screen. The management menu can provide the user with a quick path to a target position (the sub-screen or the folder included in the sub-screen) that the user wants to move to. The user may conveniently and quickly move the icon of the newly installed first application to the target position by using the quick path. This improves human-computer interaction performance. In addition, after the installation of the first application is completed, the user can be assisted to find the icon of the first application more conveniently and quickly. This further improves the human-computer interaction performance and therefore improves user experience. In this way, the display order of the identifiers included in the management menu is determined based on the last use time of the user, the type of the first application, or the migration habit of the user, so that the use habit of the user can be better matched, and user experience is improved.

Figure 15:
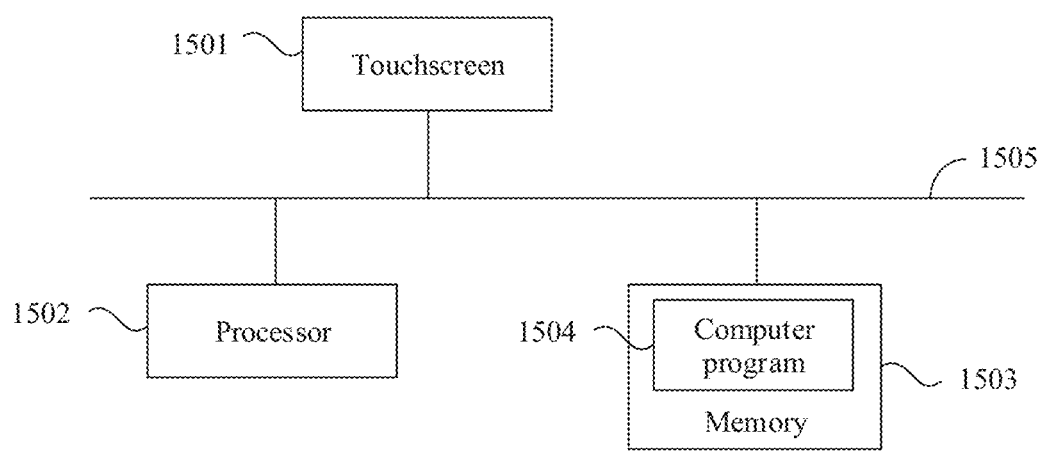
FIG. 15 is a schematic structural diagram of another electronic device according to an embodiment of this application.

Some other embodiments of this application further provide an electronic device, configured to perform the methods in the foregoing method embodiments. As shown in FIG. 15, the electronic device may include a touchscreen 1501, one or more processors 1502, and a memory 1503. The foregoing components may be connected by using one or more communications buses 1505. The memory 1503 stores one or more computer programs 1504, the one or more processors 1502 are configured to execute the one or more computer programs 1504, the one or more computer programs 1504 include instructions, and the instructions may be used to perform the steps performed by the electronic device in the corresponding embodiment in FIG. 3. The touchscreen 1501 may be configured to: receive an operation of a user, and display content according to an instruction of the one or more processors 1502.

For example, the one or more processors 1502 are configured to run the one or more computer programs 1504, to implement the following action: indicating the touchscreen 1501 to display a first interface, where the first interface may include a first button, for example, the foregoing "Install" button; receiving, by the touchscreen 1501, a first operation performed by a user on the first button, for example, the operation 1; in response to the first operation, installing a first application on the electronic device; after the installation of the first application is completed, indicating the touchscreen 1501 to display a second interface, where the second interface may include an icon of the first application; receiving, by the touchscreen 1501, a second operation performed by the user on the icon of the first application, for example, the foregoing operation 3; in response to the second operation, indicating the touchscreen 1501 to display a management menu, where the management menu is displayed around the icon of the first application, and the management menu may include one or more of the following identifiers: an identifier of a sub-screen of a home screen of the electronic device, or an identifier of a folder included in a sub-screen; receiving, by the touchscreen 1501, a third operation performed by the user on a first identifier included in the management menu, for example, the foregoing operation 4; and in response to the third operation, moving the icon of the first application to a sub-screen or a folder corresponding to the first identifier.

Some other embodiments of this application further provide a computer storage medium. The computer storage medium may include computer instructions, and when the computer instructions run on an electronic device, the electronic device is enabled to perform the steps performed by the electronic device in the corresponding embodiment in FIG. 3.

Some other embodiments of this application further provide a computer program product. When the computer program product runs on a computer, the computer is enabled to perform the steps performed by the electronic device in the corresponding embodiment in FIG. 3.

Some other embodiments of this application further provide an apparatus. The apparatus has a function of implementing behavior of the electronic device in the embodiment corresponding to FIG. 7. The function may be implemented by hardware, or may be implemented by hardware executing corresponding software. The hardware or software includes one or more modules corresponding to the foregoing function, for example, a display unit or module, an input unit or module, an installation unit or module, and a moving unit or module.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device comprising:
a display;
a memory configured to store one or more computer programs; and
a processor coupled to the display and the memory, wherein the one or more computer programs cause the processor to be configured to:
receive one or more user inputs for an application market of the electronic device;
display, using the display and in response to the one or more user inputs, a first user interface provided by the application market to download and install a first application, wherein the first user interface comprises a first button configured to receive a user operation and a first identifier to mark the first application;
receive a first user operation on the first button;
download and install the first application in response to the first user operation;
receive a second user operation during downloading or installing the first application;
display, using the display and in response to the second user operation, a second user interface of a second application, wherein the second application is not it the application market;
display, using the display, a first icon in a floating display manner on the second user interface after the first application is downloaded and installed, wherein the first icon indicates that the first application has been installed; and
receive a third user operation on the first icon; and
display, using the display and in response to the third user operation, a third user interface comprising a first window associated with the first icon, wherein the first window is not displayed on the display in a full screen.

2. The electronic device of claim 1, wherein during downloading or installing the first application, a fourth user interface displayed on the display does not comprise the first icon.

3. The electronic device of claim 1, wherein the first icon further indicates that the first application has been downloaded and installed.

4. The electronic device of claim 3, wherein the first button comprises a text of install, wherein the second application is different from the first application, and wherein the second application comprises one of an application corresponding to a home screen or a third-party application.

5. The electronic device of claim 4, wherein the first user interface further comprises a pentagram, a score reflecting a historical evaluation, and an application profile related to the first application, wherein the electronic device comprises a mobile phone, a tablet computer, a desktop computer, a laptop computer, a wearable device, an in-vehicle computer, an augmented reality device, or a virtual reality device, and wherein a difference between the third user interface and the second user interface is that the second user interface further comprises the first icon.

6. The electronic device of claim 5, wherein the first window comprises at least one icon, and wherein the at least one icon comprises a folder icon.

7. The electronic device of claim 5, wherein the first window comprises at least one icon associated with the home screen.

8. A method implemented by an electronic device comprising a display, wherein the method comprises:
receiving one or more user inputs for an application market of the electronic device;
displaying, in response to the one or more user inputs, a first user interface provided by the application market to download and install a first application, wherein the first user interface comprises a first button configured to receive a user operation and a first identifier to mark the first application;
receiving a first user operation on the first button;
downloading and installing the first application in response to the first user operation;
receiving a second user operation during downloading or installing the first application;
displaying, in response to a second user operation, a second user interface of a second application, wherein the second application is other than the application market;
displaying a first icon in a floating display manner on the second user interface after the first application is downloaded and installed, wherein the first icon indicates that the first application has been installed;
receiving a third user operation on the first icon; and
displaying, in response to the third user operation, a third user interface comprising a first window associated with the first icon, wherein the first window is not displayed on the display in a full screen.

9. The method of claim 8, wherein during downloading or installing the first application, a fourth user interface displayed on the display does not comprise the first icon.

10. The method of claim 8, wherein the first icon further indicates that the first application has been downloaded and installed.

11. The method of claim 10, wherein the first button comprises a text of install, wherein the second application is different from the first application, and wherein the second application comprises one of an application corresponding to a home screen or a third-party application.

12. The method of claim 11, wherein the first user interface further comprises a pentagram, a score reflecting a historical evaluation, and an application profile related to the first application, wherein the electronic device comprises a mobile phone, a tablet computer, a desktop computer, a laptop computer, a wearable device, an in-vehicle computer, an augmented reality device, or a virtual reality device, and wherein a difference between the third user interface and the second user interface is that the second user interface further comprises the first icon.

13. The method of claim 12, wherein the first window comprises at least one icon, and wherein the at least one icon comprises a folder icon.

14. The method of claim 12, wherein the first window comprises at least one icon associated with the home screen.

15. A computer program product comprising computer-executable instructions stored on a non-transitory computer-readable storage medium that, when executed by a processor, cause an electronic device to:
  receive one or more user inputs for an application market of the electronic device;
  display, in response to the one or more user inputs, a first user interface provided by the application market to download and install a first application, wherein the first user interface comprises a first button configured to receive a user operation and a first identifier to mark the first application;
  receive a first user operation on the first button;
  download and install the first application in response to the first user operation;
  receive a second user operation during downloading or installing the first application;
  display, in response to the second user operation, a second user interface of a second application, wherein the second application is other than the application market;
  display a first icon in a floating display manner on the second user interface after the first application is downloaded and installed, wherein the first icon indicates that the first application has been installed;
  receive a third user operation on the first icon; and
  display, in response to the third user operation, a third user interface comprising a first window associated with the first icon, wherein the first window is not displayed on the display in a full screen.

16. The computer program product of claim 15, wherein during downloading or installing the first application, a fourth user interface displayed on the display does not comprise the floating-displayed first icon.

17. The computer program product of claim 15, wherein the first icon further indicates that the first application has been downloaded and installed.

18. The computer program product of claim 17, wherein the first button comprises a text of install, wherein the second application is different from the first application, and wherein the second application comprises one of an application corresponding to a home screen or a third-party application.

19. The computer program product of claim 18, wherein the first user interface further comprises a pentagram, a score reflecting a historical evaluation, and an application profile related to the first application, wherein the electronic device comprises a mobile phone, a tablet computer, a desktop computer, a laptop computer, a wearable device, an in-vehicle computer, an augmented reality device, or a virtual reality device, and wherein a difference between the third user interface and the second user interface is that the second user interface further comprises the first icon.

20. The computer program product of claim 19, wherein the first window comprises at least one icon, and wherein the at least one icon comprises at least one of a folder icon or is associated with the home screen.

* * * * *